US012478658B2

(12) United States Patent
Qi et al.

(10) Patent No.: US 12,478,658 B2
(45) Date of Patent: Nov. 25, 2025

(54) ENHANCED EFFICACY OF COMBINATION OF GEMCITABINE AND PHOSPHATIDYLSERINE-TARGETED NANOVESICLES AGAINST PANCREATIC CANCER

(71) Applicant: University of Cincinnati, Cincinnati, OH (US)

(72) Inventors: Xiaoyang Qi, Cincinnati, OH (US); Kombo Flore N'guessan, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 580 days.

(21) Appl. No.: 17/908,745

(22) PCT Filed: Mar. 10, 2021

(86) PCT No.: PCT/US2021/021620
§ 371 (c)(1),
(2) Date: Sep. 1, 2022

(87) PCT Pub. No.: WO2021/183595
PCT Pub. Date: Sep. 16, 2021

(65) Prior Publication Data
US 2023/0130698 A1  Apr. 27, 2023

Related U.S. Application Data

(60) Provisional application No. 62/987,571, filed on Mar. 10, 2020.

(51) Int. Cl.
A61K 38/17 (2006.01)
A61K 9/127 (2025.01)
A61K 31/337 (2006.01)
A61K 31/7068 (2006.01)
A61K 45/06 (2006.01)
A61K 47/24 (2006.01)
A61P 1/18 (2006.01)
A61P 35/00 (2006.01)

(52) U.S. Cl.
CPC .......... *A61K 38/1709* (2013.01); *A61K 9/127* (2013.01); *A61K 31/337* (2013.01); *A61K 31/7068* (2013.01); *A61K 45/06* (2013.01); *A61K 47/24* (2013.01); *A61P 1/18* (2018.01); *A61P 35/00* (2018.01)

(58) Field of Classification Search
CPC .. A61K 38/1709; A61K 9/127; A61K 31/337; A61K 31/7068; A61K 45/06; A61K 47/24; A61K 38/18; A61P 1/18; A61P 35/00; A61P 35/02
See application file for complete search history.

(56) References Cited

U.S. PATENT DOCUMENTS

| 7,834,147 B2* | 11/2010 | Qi | A61P 43/00 530/300 |
| 8,937,156 B2 | 1/2015 | Qi | |
| 2018/0169120 A1* | 6/2018 | Qi | A61K 9/1075 |
| 2018/0224456 A1 | 8/2018 | Andersson | |

FOREIGN PATENT DOCUMENTS

| WO | 2014078522 A1 | 5/2014 |
| WO | 2019079164 A1 | 4/2019 |
| WO | 2019079245 A1 | 4/2019 |

OTHER PUBLICATIONS

Imaging and Therapy of Pancreatic Cancer with Phosphatidylserine-Targeted Nanovesicles, Translational Oncology, 2015). (Year: 2015).*
Qi et al. (Combined effect of gemcitabine (GEM) and sapC-DOPS nanovesicles on pancreatic ductal adenocarcinoma (PDAC) in mice. 2018 ASCO Annual Meeting (Year: 2018).*
EP Extended European Search Report dated Mar. 19, 2024 pertaining to EP application No. 21767046.2 filed Oct. 7, 2022, pp. 1-7.
Olowokure, O. et al. "Pancreatic cancer: current standards, working towards a new therapeutic approach" Expert Review of Anticancer Therapy, Mar. 13, 2014, pp. 495-497, vol. 14, No. 5, ISSN: 1473-7140, doi: 10.1586/14737140.2014.895937.
Qi, X. et al. "P-040 Phosphatidylserine Targeted Theraphy of Pancreatic Cancer Using SapC-DOPS Nanovesicles" Annals of Oncology, 2015, vol. 26, Supplement 4, doi: 10.1093/annonc/mdv233.40.
International Search Report mailed on Jun. 15, 2021 in reference to co-pending application No. PCT/US2021/021620 filed Mar. 10, 2021.
Written Opinion mailed on Jun. 15, 2021 in reference to co-pending application No. PCT/US2021/021620 filed Mar. 10, 2021.
Blanco et al. Transl Oncol 2015;8(3):1796-203).
Wojton et al. Mol Ther 2013;21(8):1517-1525.
HPB(Oxford) 2008;10(1):58-62.
Arikketh et al J Biol Chem 2008;283(19): 12888-97.
Innocente et al. Proc Natl Acad Sci USA 1999;96(5): 2147-52.
Park et al. Braz J. Med Biol Res 2015;48(2):111-9.
Davis et al. Oncotarget 2019;10:856-868.

(Continued)

*Primary Examiner* — Robert A Wax
*Assistant Examiner* — John Seungjai Kwon
(74) *Attorney, Agent, or Firm* — DINSMORE & SHOHL LLP

(57) ABSTRACT

The present disclosure concerns methods for treating pancreatic cancer cells with a combination of gemcitabine (GEM) and SapC-DOPS. In some aspects, GEM treatment preferentially targets G1 phase cells which are low in surface phosphatidylserine (PS), resulting in an increased median surface PS level of PDAC cells. Inversely, SapC-DOPS targets high surface PS cells which are predominantly in the G2/M phase. In other aspects, a combination therapy on tumors in vivo with SapC-DOPS and GEM or Abraxane® (Abr)/GEM is demonstrated to significantly inhibit tumor growth and increases survival.

20 Claims, 23 Drawing Sheets

Specification includes a Sequence Listing.

(56) References Cited

OTHER PUBLICATIONS

Collisson et al Cancer Discov 2012;2(8):685-93.
Huang et al Cancer Res 2005;65(10):4408-16.
Beck A et al., Int J Cancer 2006;118(10): 2639-43.
Judy et al. Neoplasia 2012;14(4): 352-9.
Wojton et al. Oncotarget 2014;5(20): 9703-9.

* cited by examiner

A

B

A

B

A

B

B  Day 41  Day 99

A

B

ENHANCED EFFICACY OF COMBINATION OF GEMCITABINE AND PHOSPHATIDYLSERINE-TARGETED NANOVESICLES AGAINST PANCREATIC CANCER

CROSS-REFERENCE TO RELATED APPLICATIONS

This application is a U.S. National Stage Entry under 35 U.S.C. § 371 of International Patent Application No. PCT/US2021/021620, filed Mar. 10, 2021, which claims priority to U.S. Provisional Patent Application 62/987,571, filed Mar. 10, 2020, the entire contents of which are hereby incorporated by reference.

FIELD OF THE DISCLOSURE

This disclosure relates to administration of gemcitabine and analogs thereof in combination with phosphatidylserine nanovesicles for the treatment of pancreatic cancer cells.

BACKGROUND

Pancreatic ductal adenocarcinoma (PDAC) is the $12^{th}$ most frequent cancer worldwide. While it is currently the $4^{th}$ leading cause of cancer-related deaths in the United States, it is projected to become the $2^{nd}$ by 2030. PDAC carries the highest mortality rate (~94% at 5 years post-diagnosis) of all major cancers. Its early symptoms are undefined and specific biomarkers are lacking, resulting in approximately 80% of patients presenting with advanced, inoperable tumors. These include 30% with locally advanced disease and over 50% with metastases involving regional lymph nodes, liver, and occasionally the lungs. Only ~20% of patients are eligible for potentially curative surgical resection, but the complete tumor eradication rate among these is only ~15%, and even with adjuvant chemotherapy the median survival of resected patients is 20-23 months. Current standard of treatment for non-resectable, advanced PDAC, FOLFIRINOX or the nucleoside analog gemcitabine, GEM, Gemzar® (used in combination with Abraxane®) prolongs survival by only several months in chemo-sensitive patients. GEM co-therapy with radiation or other drugs is sometimes useful, but for most patients treatment is primarily palliative. Although our understanding of the molecular factors governing PDAC origin and progression have advanced considerably, there is still a lack of novel and effective therapeutic approaches.

Multiple studies have shown that pancreatic and other cancer cells have abnormally high surface phosphatidylserine (PS), a phospholipid generally located on the inner leaflet of the cell membrane. SapC-DOPS is a biologic anticancer agent that targets cell surface PS. It contains a human lysosomal protein, saposin C (SapC) that is associated with lipophilic nanovesicles composed of dioleoylphosphatidylserine (DOPS). SapC binds PS on the surface of cells with high affinity and once inside the cell can bind membrane PS and activate lysosomal enzymes, leading to ceramide production and subsequent apoptotic cancer cell death. Importantly, PS binding is required for SapC-DOPS's cytotoxic function, and by targeting PS-rich domains on neoplastic cell membranes, SapC-DOPS has been shown to selectively kill tumor cells in both in vivo and in vitro models of pancreatic cancer without apparent off-target toxicity to normal cells and tissues. In support of this, a Phase I clinical trial has recently been completed showing an exemplary safety profile. Importantly, an increase in surface PS is a common consequence of cytotoxic drug exposure, suggesting that standard chemotherapy treatments for PDAC (e.g. GEM) and other cancers may potentiate the anti-tumor actions of SapC-DOPS as SapC-DOPS more readily kills cells with high surface PS.

SUMMARY OF THE DISCLOSURE

The present disclosure concerns a method for treating a cancerous or pre-cancerous pancreatic cell through administering to the cell a therapeutically effective amount of SapC-DOPS (saposin C-dioleoylphosphatidylserine) and a nucleoside chemotherapeutic. In some aspects, the nucleoside chemotherapeutic includes gemcitabine. In further aspects, the method may further include administering nab-paclitaxel.

In some aspects, the present disclosure concerns a method for treating a cancerous or pre-cancerous pancreatic cell through administering to the cell a therapeutically effective amount of SapC-DOPS (saposin C-dioleoylphosphatidylserine) and a nucleoside chemotherapeutic with SapC-DOPS and the nucleoside chemotherapeutic being administered simultaneously. In other aspects, SapC-DOPS and the nucleoside chemotherapeutic can be administered sequentially.

In some aspects, the present disclosure concerns a method for treating a cancerous or pre-cancerous pancreatic cell through administering to the cell in vitro a therapeutically effective amount of SapC-DOPS (saposin C-dioleoylphosphatidylserine) and a nucleoside chemotherapeutic. In other aspects, the present disclosure concerns a method for treating a cancerous or pre-cancerous pancreatic cell through administering to the cell in vivo a therapeutically effective amount of SapC-DOPS (saposin C-dioleoylphosphatidylserine) and a nucleoside chemotherapeutic.

In some aspects, the present disclosure concerns a method for treating pancreatic cancer in a subject, including administering a combination of a therapeutically effective amount of SapC-DOPS and a nucleoside chemotherapeutic to the subject. In certain aspects, the nucleoside chemotherapeutic may include gemcitabine. In further aspects, the method may further include administering nab-paclitaxel.

In some aspects, the SapC-DOPS and the nucleoside chemotherapeutic can be administered to the subject simultaneously. In other aspects, the SapC-DOPS and the nucleoside chemotherapeutic can be administered to the subject sequentially.

In some aspects, the present disclosure concerns a method for treating pancreatic cancer in a subject, including administering a combination of a therapeutically effective amount of SapC-DOPS, a nucleoside chemotherapeutic and an additional chemotherapeutic and/or therapy to the subject. In some aspects, the additional chemotherapeutic may be selected from everolimus, erlotinib, 5-fluorouracil, irinotrecan, olaparib, mitomycin, paclitaxel, sunitinib, FOLFIRINOX, cisplatin, oxaliplatin, lanreotide, lutetium Lu 177-dotatate, or a combination thereof. In other aspects, the additional therapy may include any one or more of antibody therapy, gene silencing therapy, vaccine therapy, and/or radiation therapy.

In some aspects, the combination SapC-DOPS and a nucleoside chemotherapeutic can be administered in a plurality of doses over a treatment period. In certain aspects, the treatment period may be of from about 14 to about 40 consecutive days.

In some aspects, SapC-DOPS can be administered to the subject in a dose of from about 0.3 mg/kg to about 12 mg/kg. In other aspects, the nucleoside chemotherapeutic can be administered to the subject in a dose of from about 10 mg/kg to about 150 mg/kg.

In some aspects, the present disclosure concerns a method for sensitizing a pancreatic cell to SapC-DOPS by administering to the pancreatic cell gemcitabine. As identified herein, administration of gemcitabine can increase cell surface expression of phosphatidylserine (PS), which renders the cell sensitive to SapC-DOPS binding.

DETAILED DESCRIPTION

Figure 1:
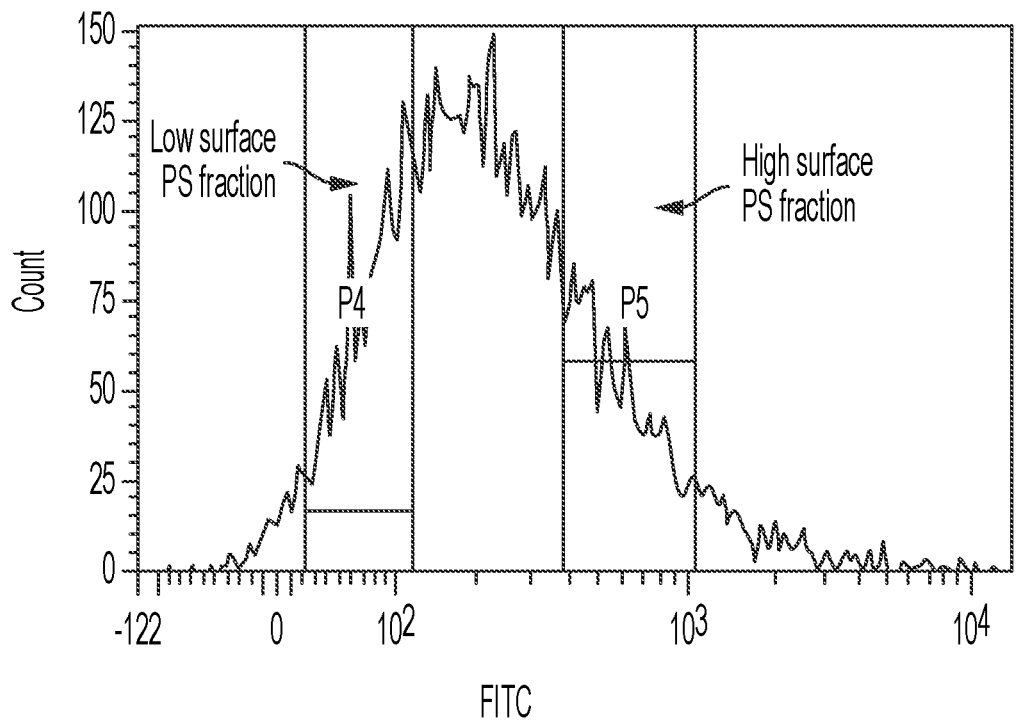
FIG. 1 shows that cells with low surface PS are more sensitive to GEM. A shows cfPac-1 cells stained with annexin V-FITC and then sorted according to surface PS levels. B shows the cells then plated on 96 wells and treated with the indicated doses of GEM for 72 hr. $*p<0.05$ compared to low surface PS cells.
Figure 1:
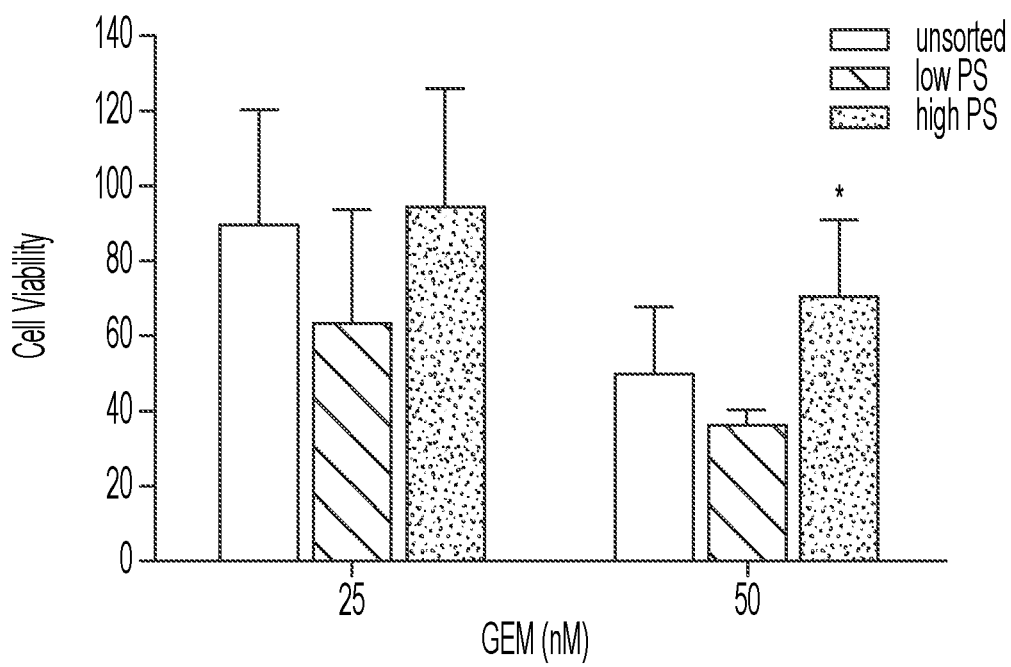

This disclosure relates to the methods for treating malignant, cancerous or abnormal cells through a successive series of treatment steps and/or a combinatorial therapeutic regimen. In some aspects the cells are pancreatic cells or are of pancreatic origin. In further aspects, the cells are abnormal or mutated or initiated such that they possess an ability for dysregulated and/or uncontrolled growth. In further aspects, the cells are in vitro, in vivo, ex vivo and/or ex situ for part of all of the methods as set forth herein.

The following description of particular aspect is merely exemplary in nature and is in no way intended to limit the scope of the disclosure, its application, or uses, which may, of course, vary. The disclosure is described with relation to the non-limiting definitions and terminology included herein. These definitions and terminology are not designed to function as a limitation on the scope or practice thereof but are presented for illustrative and descriptive purposes only.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, pH, size, concentration or percentage is meant to encompass variations of in some aspects ±20%, in some aspects ±10%, in some aspects ±5%, in some aspects ±1%, in some aspects ±0.5%, and in some aspects ±0.1% from the specified amount, as such variations are appropriate to perform the disclosed method.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

In some aspects, the present disclosure concerns methods of treating cells. In some aspects, the cell is an abnormal cell or a cell having undergone at least an initiation step towards dysregulated growth and/or dysregulated cell death and/or apoptosis. It is understood in the art that cells can progress from normal to cancerous through one or more steps of initiation, promotion and/or progression. In some aspects, the methods of the present disclosure can focus on treating any cell from having undergone an initiation step, to a progression and/or promotion step, to being malignant, cancerous, and/or to being metastatic in nature.

In some aspects, the methods of the present disclosure concern treating or administration of the therapeutics described herein to a tumor. A tumor may refer to a mass or a collection of cancerous or abnormal cells that include cells having undergone an initiation step toward dysregulated growth and/or dysregulated cell death and/or apoptosis. In some aspects, a tumor may include one or more malignant cells and/or one or more metastatic cells.

In some aspects, the methods of the present disclosure concern treating or administration of the therapeutics described herein to a subject or a patient, such as a subject or a patient with a tumor and/or an abnormal or cancerous cell or population thereof. As used herein a "subject" or "patient" refers to a mammal. Optionally, a subject or patient is a human or non-human primate. Optionally, a subject or patient is a dog, cat, horse, sheep, cow, rabbit, pig, or mouse. In some aspects, the subject may be diagnosed with a tumor and/or suspected of having or possessing such within one or more organs or bodily systems. In other aspects, the subject may be unaware of the presence of a tumor or the tumor may be at a point of growth or progression such that it avoids detection. In further aspects, the methods of the present disclosure can be used prophylactically on a subject to prevent or alleviate any cell initiation, progression and/or promotion into a tumor or a precursor thereof.

In some aspects, the methods of the present disclosure concern administration of a therapeutic or a combination of two or more therapeutics to a cell of the pancreas or a cell derived therefrom. The pancreatic cell may be cancerous or pre-cancerous in nature, such as having undergone one or more steps of initiation, promotion and/or progression. The administration may be directly to the cell or to an environment external thereto. For example, if the cell is in a media, administration to the media can effectuate administration to the cell, such as administering to a cell culture media for cells cultured in vitro. In other aspects, such as where the cell is in vivo, administration may be administered locally, such as to a site or organ of interest, including to the pancreas. Other routes of administration may also be used to allow for delivery of the administered compound(s) to the cell, including systemic administration by routes understood in the art, including intravenous, sublingual, oral, transdermal, intraperitoneal, intramuscularly, buccally, mucosally or combinations thereof.

In some aspects, the present disclosure concerns methods of administering SapC-DOPS (Saposin C-dioleoylphosphatidylserine) to cell. In some aspects, the methods include administering SapC-DOPS to a pancreatic cell, including to a cancerous or precancerous pancreatic cell. In further aspects, the methods include administering SapC-DOPS to a pancreatic cell in combination with one or more other therapeutic agents. It has been previously shown that SapC-DOPS is effective in murine xenografts of human PDAC (Chu et al. PLoS One 2013; 8(10):e75507; Blanco et al. Transl Oncol 2015; 8(3):196-203). Herein, it is demonstrated that gemcitabine (GEM) selectively targets and kills cancer cells in G1 phase of the cell cycle which are low in surface PS, leaving behind high surface PS cells that are targeted by SapC-DOPS. Thus, SapC-DOPS and GEM combination treatment leads to enhanced anti-tumor effects both in vitro and in in vivo mouse models.

SapC-DOPS refers to a stable nanovesicle composition that is composed of saposin C (SapC), which is a lysosomal protein that catabolizes glycosphingolipids, and the phospholipid dioleoylphosphatidylserine (DOPS). SapC-DOPS is further described in U.S. Pat. No. 8,937,156, issued Jan. 20, 2015, which is incorporated herein by reference in its entirety. In one aspect. SapC may include a peptide or polypeptide with an amino acid sequence that includes the sequence of SDVYCEVCEFLVKEVTKLIDNNK-TEKEILDAFDKMCSKLPKSLSEECQEVVDT YGSSILSI LLEEVSPELVCSMLHLCSG (SEQ ID NO: 1). In some aspects, SapC may include an amino acid sequence having from about 75 to about 100% identity to SEQ ID NO: 1, including about 76, 77, 78, 79, 80, 81, 82, 83, 84, 85, 86, 87, 88, 89, 90, 91, 92, 93, 94, 95, 96, 97, 98, and 99% sequence identity to SEQ ID NO: 1.

In some aspects, the present disclosure concerns the administration of SapC-DOPS in combination with a nucleoside chemotherapeutic. In some aspects, the nucleoside chemotherapeutic can act by inhibiting, decreasing and/or blocking the formation of DNA. In some aspects, the nucleoside chemotherapeutic can be selected from one or more of deoxyadenosine analogs, adenosine analogs, deoxycytidine analogs, guanosine or deoxyguanosine analogs, thymidine or deoxythymidine analogs or deoxyuridine analogs. In certain aspects, the nucleoside chemotherapeutic is a deoxycytidine analog such as cytarabine or gemcitabine. In some aspects, the nucleoside chemotherapeutic is gemcitabine or 2', 2'-difluoro 2'deoxycytidine or GEMZAR or an analog thereof.

As described in the working examples herein, the present disclosure concerns, in part, the identification that SapC-DOPS and a nucleoside chemotherapeutic, such as gemcitabine, can target different stages of the cell cycle, thereby allowing treatment with one to enhance treatment. In some aspects, SapC-DOPS can selectively target cells with a high surface expression of phosphatidylserine (PS). In certain aspects, SapC-DOPS selectively kills high surface PS cells in a population of cells. Upon binding to PS, the saposin C component is able to exert its enzymatic activity, thereby triggering a lysosomal reaction and ultimately resulting in cell death. Conversely, gemcitabine can selectively target cells with a low surface expression of PS. Thus, in combination, the two are able to target cells with varying levels of PS expression on the surface.

In some aspects, the methods of the present disclosure concern administration of nucleoside chemotherapeutics, such as gemcitabine, and SapC-DOPS, wherein each agent can selectively target cells in different aspects of the cell cycle. As identified herein, PS surface expression can increase as a cell moves out of G1 into stages S, G2 and/or M, thereby allowing SapC-DOPS to selectively target cells in those latter cell cycle stages (see, e.g., FIG. 2). However, as identified herein, treatment with gemcitabine can target cells in stage G1 and will encourage cells to shift toward S/G2/M. Conversely, SapC-DOPS treatment causes a decrease in the G2/M cells and an increase in the G1 populations. Accordingly, through the combination of SapC-DOPS and gemcitabine, the methods set forth herein of co-administration can target cells in both G1 as well as in S, G2 and/or M as surface PS expression increases, as well as assist in providing cell populations that the other agent can selectively target.

In other aspects, the present disclosure concerns utilization of aberrant or dysregulated PS production in cancerous or precancerous cells. As identified herein, administration of gemcitabine can induce and/or increase PS surface expression in pancreatic cancer cells, whereas normal pancreatic cells show no increased PS surface expression in response to gemcitabine (see, e.g., FIG. 3). This increase in cell surface PS was observed in commonly used human pancreatic cell lines: cfPac-1 and MiaPaCa-2 as well as p53.2.1.1, but notably, not in healthy human pancreatic duct epithelial cells (see, e.g., FIG. 4). Accordingly, administration of gemcitabine allows for increase PS expression in pancreatic cancer cells, which allows SapC-DOPS, in part, to selectively target the gemcitabine treated cells.

Figure 5:
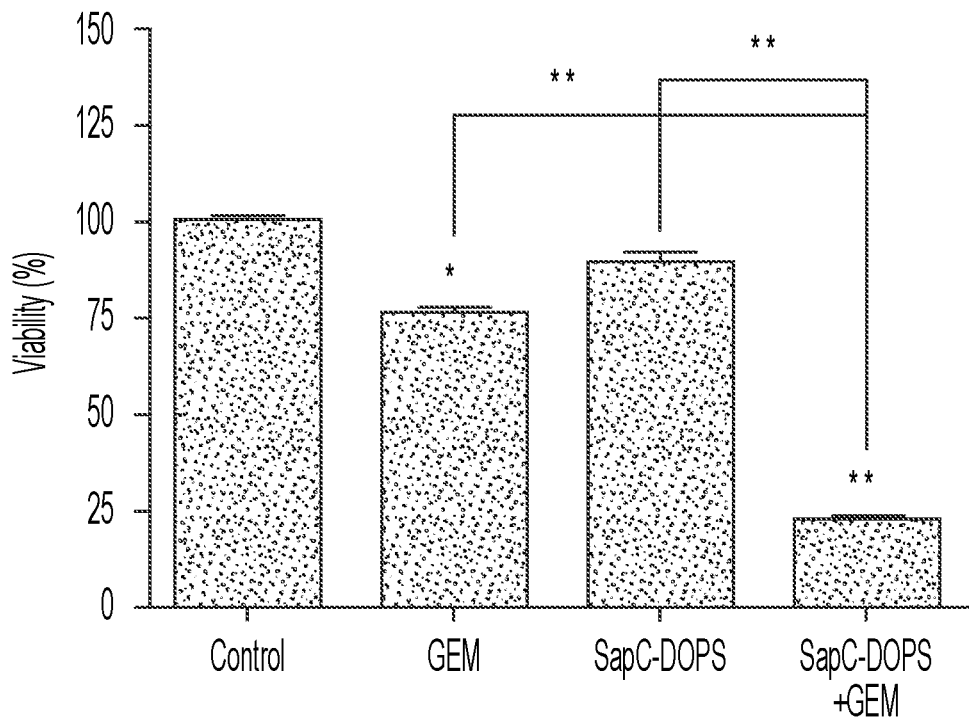
FIG. 5 shows Enhanced cytotoxicity of GEM plus SapC-DOPS on cultured PDAC cells. Sequential combination treatment with SapC-DOPS plus GEM markedly enhances cell death of cultured PDAC cells. A shows human MiaPaCa-2 cells exposed (72 hr) to vehicle, GEM (50 nM), SapC-DOPS (4 µM) or SapC-DOPS plus GEM. B shows mouse p53 2.1.1 PDAC cells exposed (72 hr.) to vehicle, GEM (2 nM), SapC-DOPS (40 µM) or SapC-DOPS plus GEM. Since current therapy consists of a combination of Abraxane (Abr) and GEM we also treated cancer cells. C shows p53.2.1.1 cells and D shows PI34 cells treated with media (control), 25 nM Abr and 25 nM GEM (Abr/GEM), the indicated concentration of SapC-DOPS or a combination of Abr/GEM and SapC-DOPS for 72 hr. Cell viability was determined by the MTT assay. Treatments were administered sequentially: cells were treated with GEM followed by SapC-DOPS 48 hr. later. $*p<0.05$, $**p<0.01$. The brackets indicate significance between the treatment groups.
Figure 5:
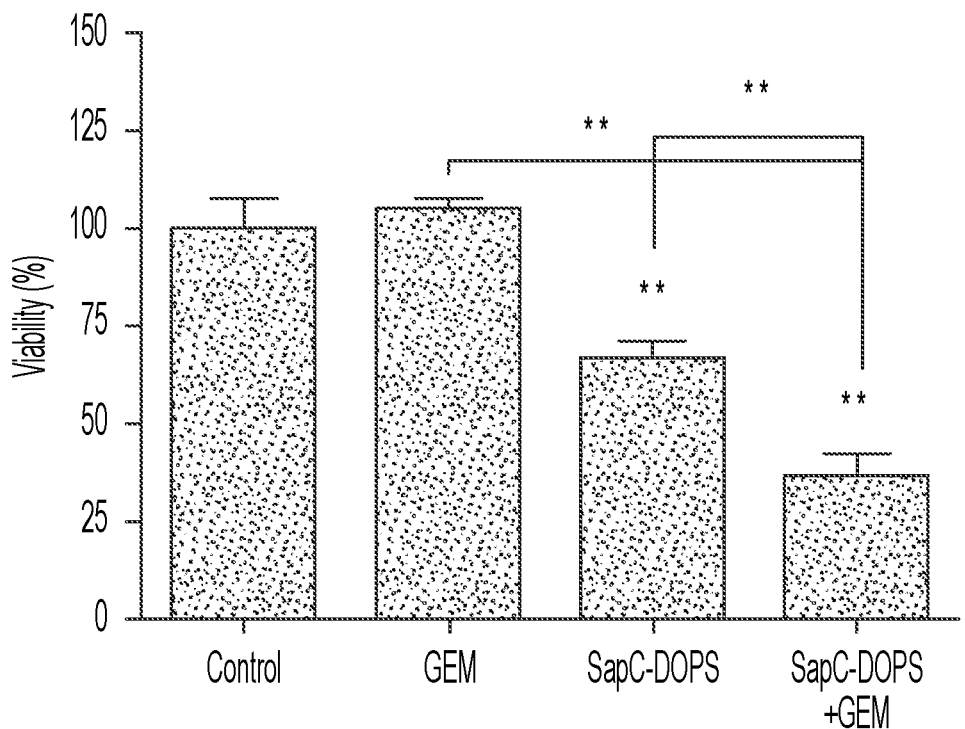
Figure 5:
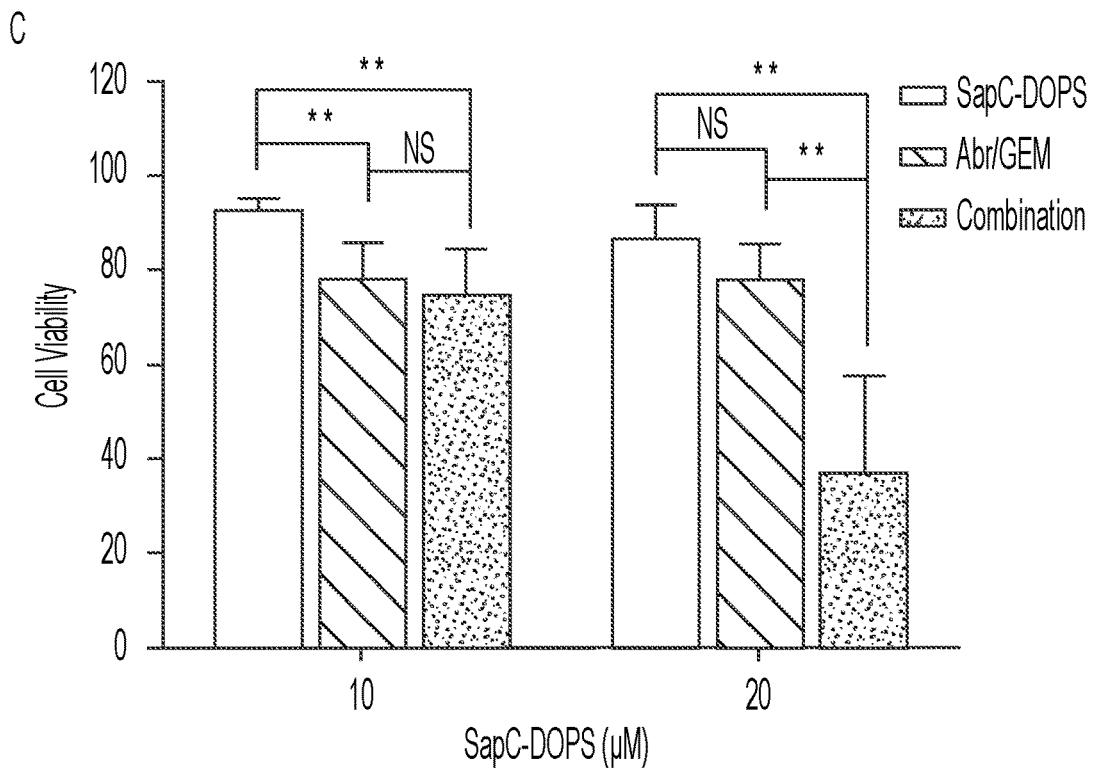
Figure 5:
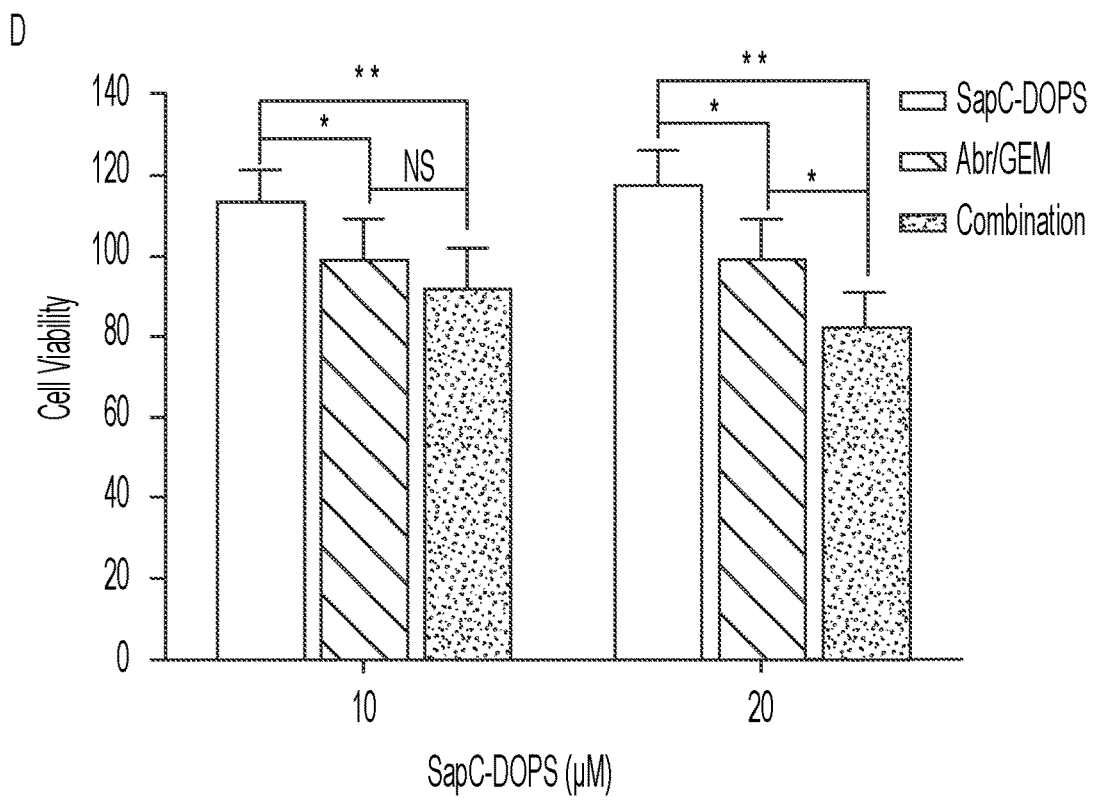

In other aspects, administration of gemcitabine can sensitize cells to treatment with SapC-DOPS (see, e.g., FIG. 5). Accordingly, as set forth herein, the co-administration or successive administration of SapC-DOPS and gemcitabine can be of benefit in treating and/or targeting cancerous or pre-cancerous pancreatic cells. The administration of gemcitabine can induce PS expression, target cells in G1, and sensitize the cells to SapC-DOPS, which allows the SapC-DOPS to target the increased PS expression, target cells in S, G2 and/M and exploit the sensitized cells. Furthermore, the treatment with SapC-DOPS can allow the cell population to favor G1, thereby allowing for further effective treatment with gemcitabine.

In some aspects, SapC-DOPS can be administered with gemcitabine as a single unitary dose, or as successive, sequential doses that are close in proximity with regard to time OR contemporaneous, such as within the same day, hour or within 30, 25, 20, 15, 10, 5, 2, 1 or less minutes of each other. As used herein, the term "contemporaneously" may refer to administration of a first therapeutic agent or therapy and administration of a second therapeutic agent or therapy, wherein the first and second therapeutic agents or therapies are separate and are administered at substantially the same time. In other aspects, the administration can be separated by a day or more, including 2, 3, 4, 5, 6, 7, 8, 9, 10, 11, 12, 13, 14, 15, 16, 17, 18, 19, and 20 days apart. The term "sequentially" refers to a treatment protocol in which administration of a first therapeutic agent or therapy is followed by administration of a second therapeutic agent or therapy. In some aspects, the therapy comprises radiation therapy, including radiation fractions. In some aspects, the dosing regimens for each compound administered may be synchronous or asynchronous, such that administration may be one the same interval between doses or each on a different schedule. Each may be administered once or more, depending on the response to treatment and any further need thereof. In some aspects, it can be considered to withdraw one of the compounds from the administration schedule.

In some aspects, the methods of the present disclosure concern administering a therapeutically effective amount of SapC-DOPS, gemcitabine, and any other agents administered to the pancreatic cells or the subject thereof. As used herein, a "therapeutically effective amount" is used with reference to the treatment of cancers or cancerous cells as an amount that will decrease, reduce, inhibit, or otherwise abrogate the growth of a cancer cell or tumor. In some aspects, the therapeutic agent(s) can be delivered regionally to a particular affected region or regions of the subject's body. In some aspects, wherein such treatment is considered more suitable, the therapeutic agent(s) can be administered systemically. For example, the compound can be administered orally or parenterally. In certain aspects, a therapeutic agent is delivered intravenously.

In some aspects, the present disclosure concerns methods of administer a therapeutically effective dose or doses of each SapC-DOPS and gemcitabine. Each individual dose of the SapC-DOPS may include an amount of from about 0.1 mg/kg to about 12.0 mg/kg SapC-DOPS, including about 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, and 11.9 mg/kg. In some aspects, an individual dose may include an amount of from about 0.2 mg/kg to about 3.0 mg/kg SapC-DOPS. In other aspects, an individual dose may include an amount of from about 0.3 to about 1.2 mg/kg SapC-DOPS.

In some aspects, SapC-DOPS may be administered as a single dose or as multiple doses over a treatment period. A "treatment period" may refer to a length of time corresponding to a therapeutic treatment regimen. In some aspects, a combination of SapC-DOPS and gemcitabine is administered over a period of time ranging from days to weeks or months. In some aspects, a treatment period comprises from about 14 to about 40 consecutive days, including 15, 16, 17, 18, 19, 20, 21, 22, 23, 24, 25, 26, 27, 28, 29, 30, 31, 32, 33, 34, 35, 36, 37, 38, and 39 days. In some aspects, a therapeutically effective amount of SapC-DOPS is administered in 10 to 15 doses over a twenty-eight day cycle. In an exemplary schedule, a dose of SapC-DOPS is administered five times during the first week; three times during weeks two and three; and once during week four.

In other aspects, gemcitabine may similarly be administered as a single dose or as multiple doses over a treatment period. In some aspects, a dose of gemcitabine may be from about 200 mg to 1 g, including about 300, 400, 500, 600, 700, 800, and 900 mg. In other aspects, gemcitabine may be administered per meter-squared ($m^2$) of a subjected, including from about 200 mg/$m^2$ to about 2000 mg/$m^2$, including about 300, 400, 500, 600, 700, 800, 900, 1000, 1100, 1200, 1300, 1400, 1500, 1600, 1700, 1800, and 1900 mg/$m^2$. Gemcitabine may be administered concurrently or synchronously with SapC-DOPS, or by infusion for about 30 min. once per week over a seven week course or intravenously once per week for 3 weeks of a 28-day cycle. In some aspects, gemcitabine may be administered in an amount of from about 10 mg/kg to about 150 mg/kg, including about 20, 30, 40, 50, 60, 70, 80, 90, 100, 110, 120, 130, and 140 mg/kg.

In some aspects, the combination of gemcitabine with SapC-DOPS provides an administered combination that works collectively to allow each agent to perform more efficiently and efficaciously. In some aspects, the presence of the other agent in the combination allows for a lower required dose. Accordingly, in some aspects, through the combination of SapC-DOPS and gemcitabine, less of each is required to be effective. For example, as gemcitabine can targets cells in G1 and SapC-DOPS targets cells in S/G2/M, while gemcitabine stimulates PS expression and a shift to S/G2/M and SapC-DOPS stimulates G1 cells, the two effectively allow the other to produce an enhanced effect. In some aspects, by combining gemcitabine with SapC-DOPS, a synergistic combination is provided for target cancerous and/or precancerous cells.

In some aspects, the methods of administering the SapC-DOPS/gemcitabine combination can be combined with other therapies and/or treatments. In one aspect, the SapC-DOPS combination can be utilized with other treatments for pancreatic cancer treatment, such as erlotinib, paclitaxel, paclitaxel protein-bound (ABRXANE or albumin-bound or nab-paclitaxel), and/or capecitabine. For example, a further compound can be added to administration of SapC-DOPS and gemcitabine, such that three or more compounds are administered in a single dose or in a single dosing regimen. Similarly, a further compound can be added with SapC-DOPS and/or gemcitabine when administered sequentially or in different dosing schedules. Alternatively all three or more compounds can be administered in isolation in a sequence or in a scheduled dosing regimen.

In some aspects, the methods of the present disclosure concern combination or successive treatment with two or more pancreatic cancer agents. In some aspects, the methods may include the administration of SapC-DOPS with one or more of the agents selected from nab-paclitaxel, everolimus, erlotinib, 5-fluorouracil, irinotrecan, olaparib, mitomycin, paclitaxel, sunitinib, FOLFIRINOX, cisplatin, oxaliplatin, lanreotide, lutetium Lu 177-dotatate, or combinations thereof.

In some aspects, the present disclosure concerns administration of SapC-DOPS with gemcitabine and nab-paclitaxel. In some aspects, all three may be administered together, in sequence, or each according to a particular dosing regimen. In other aspects, nab-paclitaxel can be combined with the administration of SapC-DOPS and/or gemcitabine. In some aspects, nab-paclitaxel can be administered at a dose of from about 50 to 200 mg/$m^2$, including about 55, 60, 65, 70, 75, 80, 85, 90, 95, 100, 105, 110, 115, 120, 125, 130, 135, 140, 145, 150, 155, 160, 165, 170, 175, 180, 185, 190, and 195 mg/$m^2$. In some aspects, nab-paclitaxel can be administered on days 1, 8, and 15 of a 28 day cycle.

In other aspects, the methods of the present disclosure can be combined with other methods of treating a cancerous or precancerous cell, such as with antibody therapies, vaccine therapy, and/or gene silencing therapies. For example, antibody therapy may include administration of an antibody and/or an active fragment thereof, such as a Fab fragment that selectively binds to a particular protein or target in the cancerous cell. Through binding of an antibody or fragment thereof, the immune system can then respond. In some aspects, the antibody or fragment thereof may be of a recombinant antibody and/or a monoclonal antibody and/or a polyclonal antibody. Examples of antibody therapies (by way of example and not limitation) include administration of cetuximab, nimotuzimab, trastuzumab, panitumumab, bevacizumab, volociximab, ipilmumab, and infliximab. Gene silencing approaches may include the administration of a nucleic acid, such as a silencing RNA or a double-stranded RNA to activate downregulation, degradation or reduced expression of a particular protein or gene in the cancerous or precancerous cells. Targets may include aberrant or overexpressed proteins associated with pancreatic cancer, including nerve growth factor (NGF), TGF-β and HIF 1α. In some aspects, the vaccine therapy may include administration of GVAX. In further aspects, the methods of the present disclosure can be utilized alongside one or more surgeries to the subject, such as to remove or resect a tumor and/or normal tissue surrounding the same. For example, the administration of SapC-DOPS and/or gemcitabine can occur prior to or following a surgical procedure, or can occur both before and after a surgery.

In further aspects, the method of the present disclosure can be combined with other treatments or therapies, such as radiation therapy. Administering a radiation therapy and administering the SapC-DOPS/gemcitabine can be accomplished in overlapping or alternating sequences. For example, a fraction of radiation may be administered to the patient on Day 1, then on Day 2, a fraction of radiation is administered to the patient together with a dose of SapC-DOPS, Additionally, SapC-DOPS may be administered to the patient on Day 1, and on Day 2 and Day 3 the patient is administered a radiation fraction.

In further aspects, SapC-DOPS and/or gemcitabine and/or nab-paclitaxel can be administered as a pharmaceutical composition and/or with a pharmaceutically acceptable carrier. A pharmaceutical composition may be in any dosage form suitable for administration to a subject, illustratively including solid, semi-solid and liquid dosage forms such as tablets, capsules, powders, granules, suppositories, pills, solutions, suspensions, ointments, lotions, creams, gels, pastes, sprays and aerosols. Liposomes and emulsions are further well-known types of pharmaceutical formulations that can be used to deliver a pharmaceutical agent. Pharmaceutical compositions may generally include a pharmaceutically acceptable carrier such as an excipient, diluent and/or vehicle. Delayed release formulations of compositions and delayed release systems, such as semipermeable matrices of solid hydrophobic polymers can be used. Similarly, SapC-DOPS and/or gemcitabine and/or nab-paclitaxel can be administered with a pharmaceutically acceptable carrier and/or an excipient. Such additives are understood in the art. For example, lists of such can be found in Remington: The Science and Practice of Pharmacy, $22^{nd}$ Ed., Pharmaceutical Press, 2012. Pharmaceutically acceptable carriers or excipients may include, but are not limited to, polymers, resins, plasticizers, fillers, lubricants, diluents, binders, disintegrants, solvents, co-solvents, buffer systems, surfactants, preservatives, sweetening agents, flavoring agents, pharmaceutical grade dyes or pigments, and viscosity agents.

A first aspect of the disclosure, either alone or in combination with any other aspect, concerns a method for treating a cancerous or pre-cancerous pancreatic cell comprising administering to the cell a therapeutically effective amount of SapC-DOPS (saposin C-dioleoylphosphatidylserine) and a nucleoside chemotherapeutic.

A second aspect of the disclosure, either alone or in combination with any other aspect, concerns the method of the first aspect, wherein the nucleoside chemotherapeutic comprises gemcitabine.

A third aspect of the disclosure, either alone or in combination with any other aspect, concerns the method of the first or second aspect, wherein SapC-DOPS and the nucleoside chemotherapeutic are administered simultaneously.

A fourth aspect of the disclosure, either alone or in combination with any other aspect, concerns the method of the first or second aspect, wherein SapC-DOPS and the nucleoside chemotherapeutic are administered sequentially.

A fifth aspect of the disclosure, either alone or in combination with any other aspect, concerns the method of any of the first aspect to the fourth aspect, wherein the cell is in vitro.

A sixth aspect of the disclosure, either alone or in combination with any other aspect, concerns the method of any of the first aspect to the fourth aspect, wherein the cell is in vivo.

A seventh aspect of the disclosure, either alone or in combination with any other aspect, concerns the method of any of the first aspect to the sixth aspect, wherein the method further comprises administering nab-paclitaxel.

An eighth aspect of the disclosure, either alone or in combination with any other aspect, concerns a method for treating pancreatic cancer in a subject, comprising administering a combination of a therapeutically effective amount of SapC-DOPS and a nucleoside chemotherapeutic to the subject.

A ninth aspect, either alone or in combination with any other aspect, concerns the method of the eighth aspect, wherein the nucleoside chemotherapeutic comprises gemcitabine.

A tenth aspect, either alone or in combination with any other aspect, concerns the method of the eighth or ninth aspect, wherein SapC-DOPS and the nucleoside chemotherapeutic are administered simultaneously.

An eleventh aspect, either alone or in combination with any other aspect, concerns the method of the eighth or ninth aspect, wherein SapC-DOPS and the nucleoside chemotherapeutic are administered sequentially.

A twelfth aspect, either alone or in combination with any other aspect, concerns the method of any of the eighth aspect to the eleventh aspect, wherein the method further comprises administering nab-paclitaxel.

A thirteenth aspect, either alone or in combination with any other aspect, concerns the method of the eighth aspect or the twelfth aspect, further comprising administering an additional chemotherapeutic or therapy to the subject.

A fourteenth aspect, either alone or in combination with any other aspect, concerns the method of the thirteenth aspect, wherein the additional chemotherapeutic is selected from the group consisting of everolimus, erlotinib, 5-fluorouracil, irinotrecan, olaparib, mitomycin, paclitaxel, sunitinib, FOLFIRINOX, cisplatin, oxaliplatin, lanreotide, lutetium Lu 177-dotatate, or a combination thereof.

A fifteenth aspect, either alone or in combination with any other aspect, concerns the method of the thirteenth aspect, wherein the additional therapy is selected from antibody therapy, gene silencing therapy, vaccine therapy, or radiation therapy.

A sixteenth aspect, either alone or in combination with any other aspect, concerns the method of any of the eighth aspect to the fifteenth aspect, wherein the combination is administered in a plurality of doses over a treatment period.

A seventeenth aspect, either alone or in combination with any other aspect, concerns the method of the sixteenth aspect, wherein the treatment period comprises from about 14 to 40 consecutive days.

An eighteenth ninth aspect, either alone or in combination with any other aspect, concerns the method of the sixteenth or seventeenth aspect, wherein SapC-DOPS is administered in a dose of from about 0.3 mg/kg to about 12 mg/kg.

A nineteenth aspect, either alone or in combination with any other aspect, concerns the method of the sixteenth, seventeenth or eighteenth aspect, wherein the nucleoside chemotherapeutic is administered in a dose of from about 10 mg/kg to about 150 mg/kg.

A twentieth aspect, either alone or in combination with any other aspect, concerns a method for sensitizing a pancreatic cell to SapC-DOPS comprising administering to the pancreatic cell gemcitabine, wherein gemcitabine increases cell surface expression of phosphatidylserine (PS), thereby sensitizing the pancreatic cell to SapC-DOPS binding.

Examples

Figure 9:
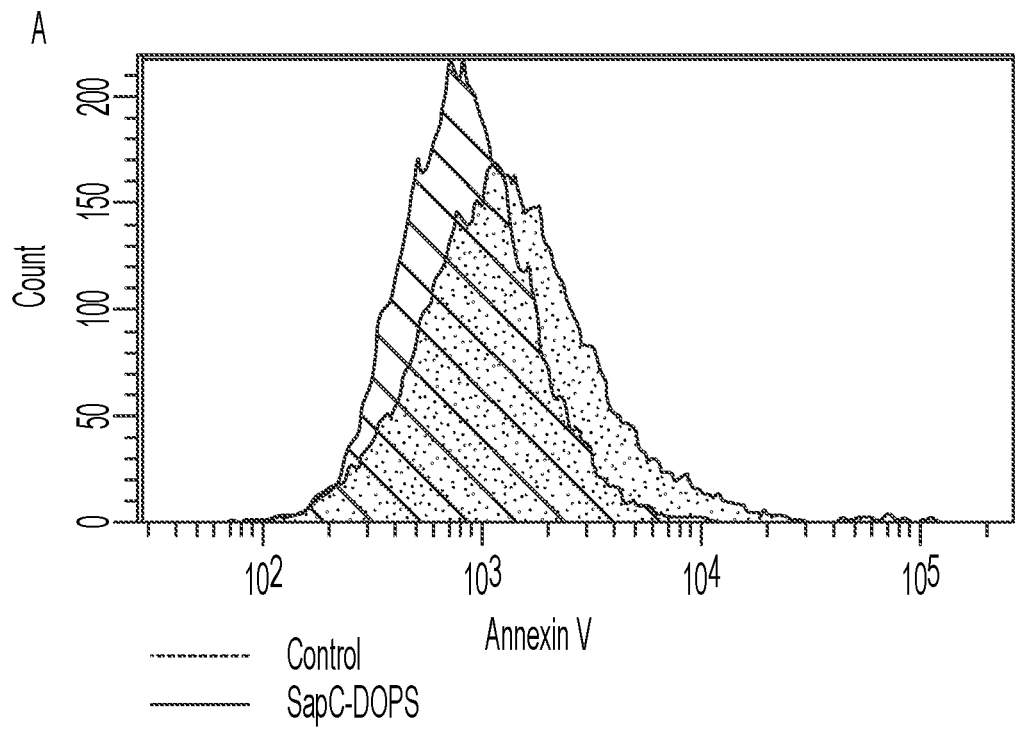
FIG. 9 shows SapC-DOPS targets high surface PS cells. Cells were treated with 30 µM SapC-DOPS for 72 hr. The media was replaced with fresh media so that the remaining SapC-DOPS would be internalized and not interfere with annexin V staining. The cells were stained with annexin V as in "Materials and Methods" to determine surface PS. A shows a histogram of annexin V fluorescence and B shows quantification of data from A.
Figure 9:
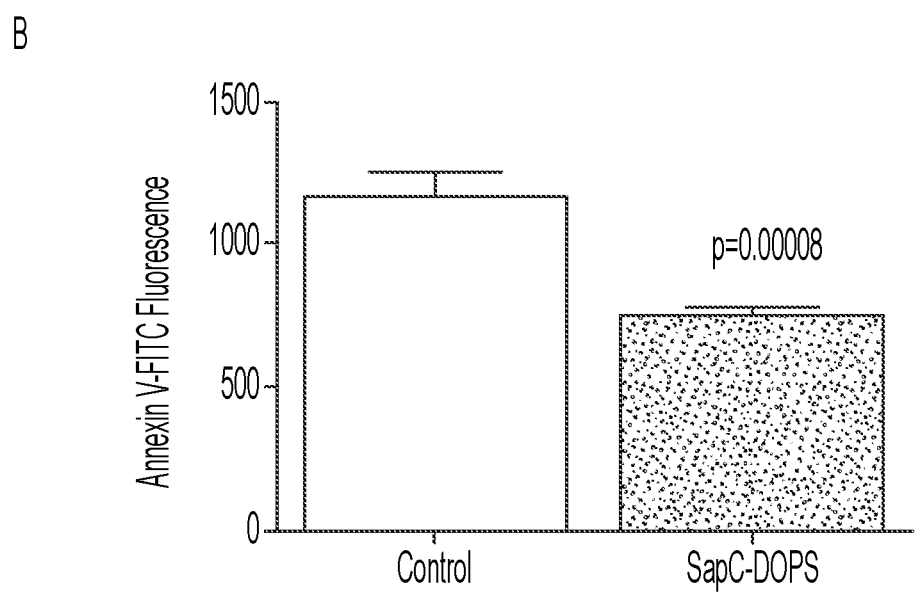

GEM is more effective on low surface PS cells after cells are sorted into low and high surface PS populations. Since SapC-DOPS specifically targets high surface cells, we investigated whether GEM had a targeting preference for high surface PS cells or low surface PS cells. Cells were sorted into low and high surface PS populations, treated with GEM then evaluated for viability. GEM killed more cells from the low surface PS population compared to the high surface PS population (FIG. 1). SapC-DOPS targets cells rich in surface PS expression because saposin C requires direct binding and interaction with PS to exert its enzyme activating activity, leading to a ceramide cascade and eventual apoptosis in cells (Wojton et al. Mol Ther 2013; 21(8):1517-25). Furthermore, it was found that the higher the PS expression on the surface of a cell, the more effectively SapC-DOPS binds to the cell and induces apoptosis (Hariharan et al. Analysis of mortality rates for pancreatic cancer across the world. HPB (Oxford) 2008; 10(1):58-62). To confirm that SapC-DOPS selectively kills high surface PS cells in a population, cells were treated with SapC-DOPS for 72 hrs. then the media with excess SapC-DOPS (which would interfere with annexin V staining) was removed and the cells were incubated for another 24 hr. As shown in FIG. 9, cells with lower surface PS remained after this treatment.

Figure 2:
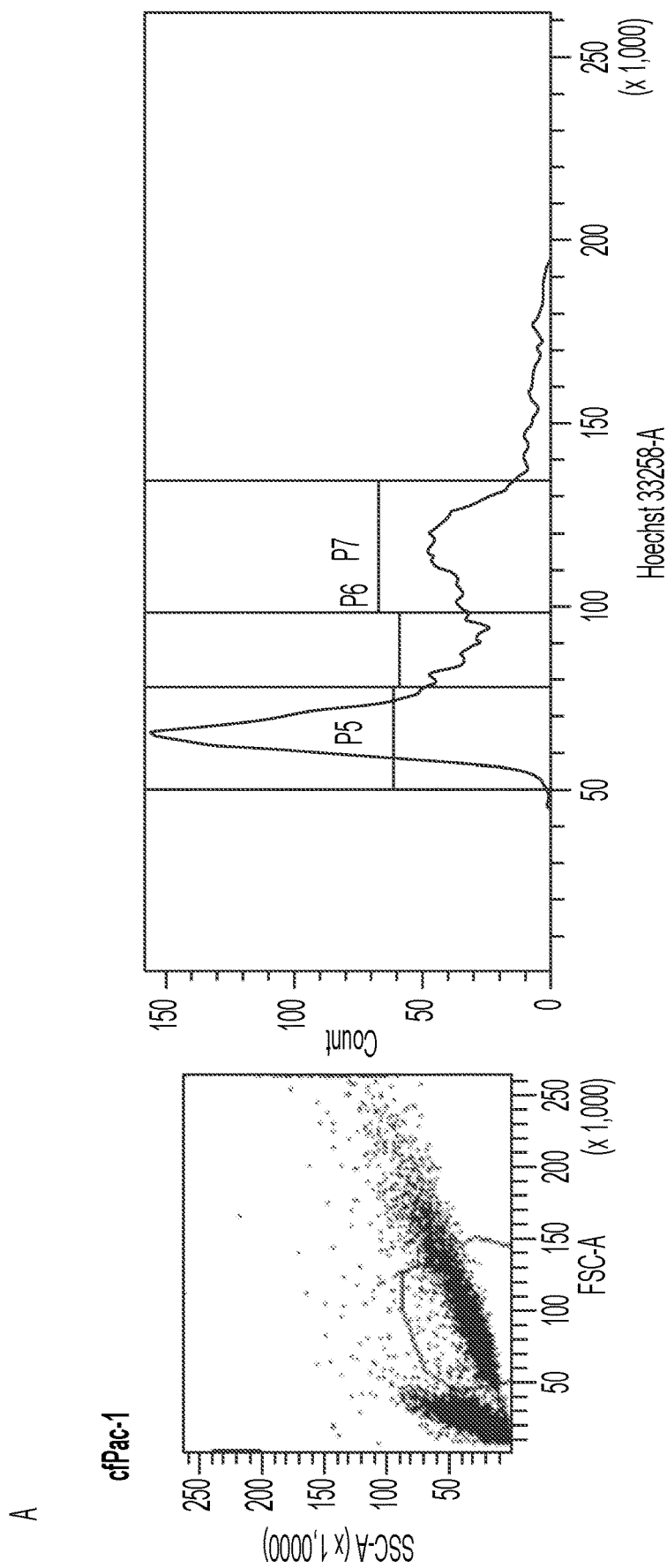
FIG. 2 shows how PS changes during the cell cycle of pancreatic cancer cells. Pancreatic cancer cell lines were stained with Hoechst 33258 then annexin V-FITC. A shows cells in G1, S and G2/M phases of the cell cycle identified by Hoechst staining. B shows Annexin V fluorescence was measured at each cell cycle stage.$*p<0.05$, $**p<0.01$, $\#p<0.001$.
Figure 2:
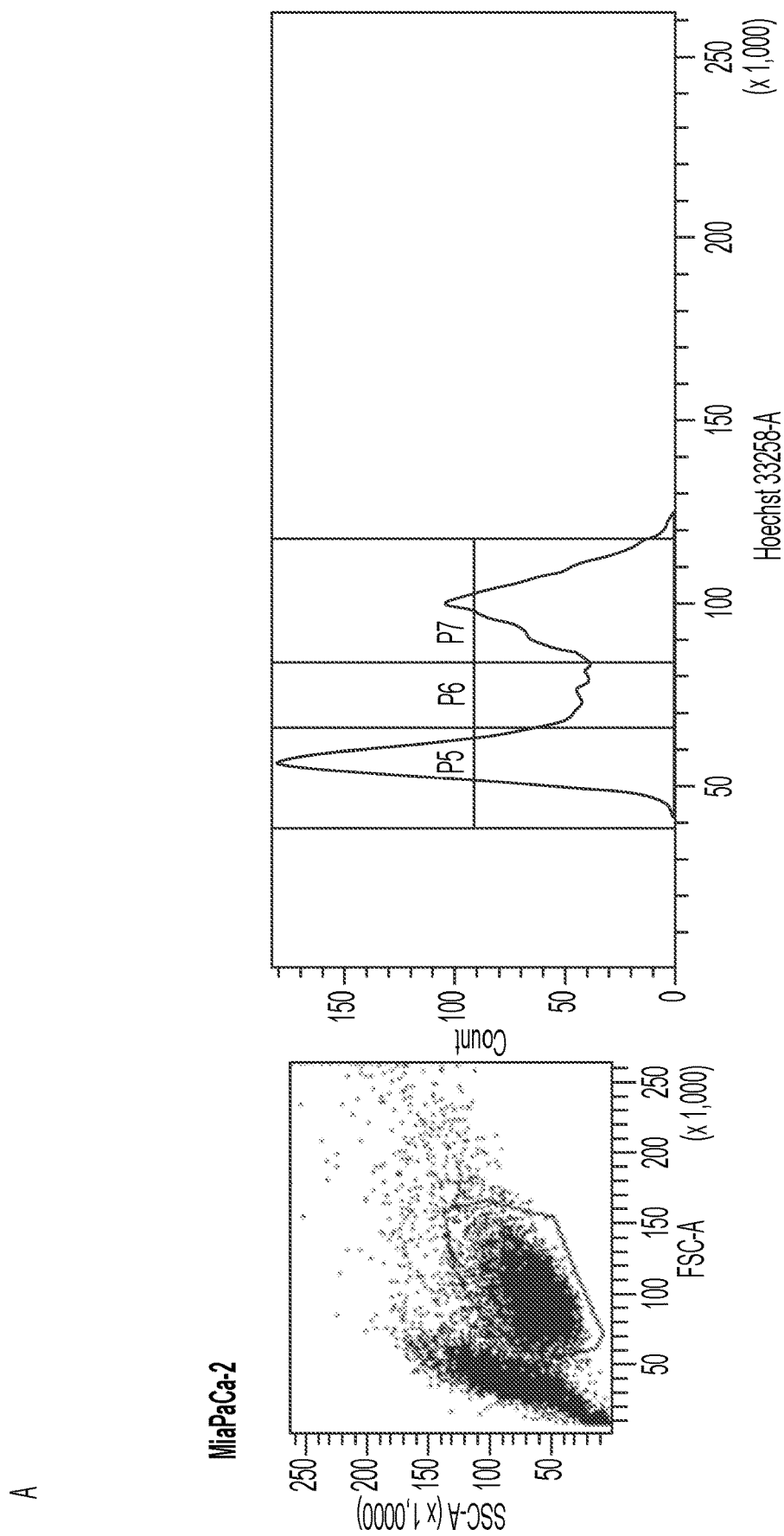
Figure 2:
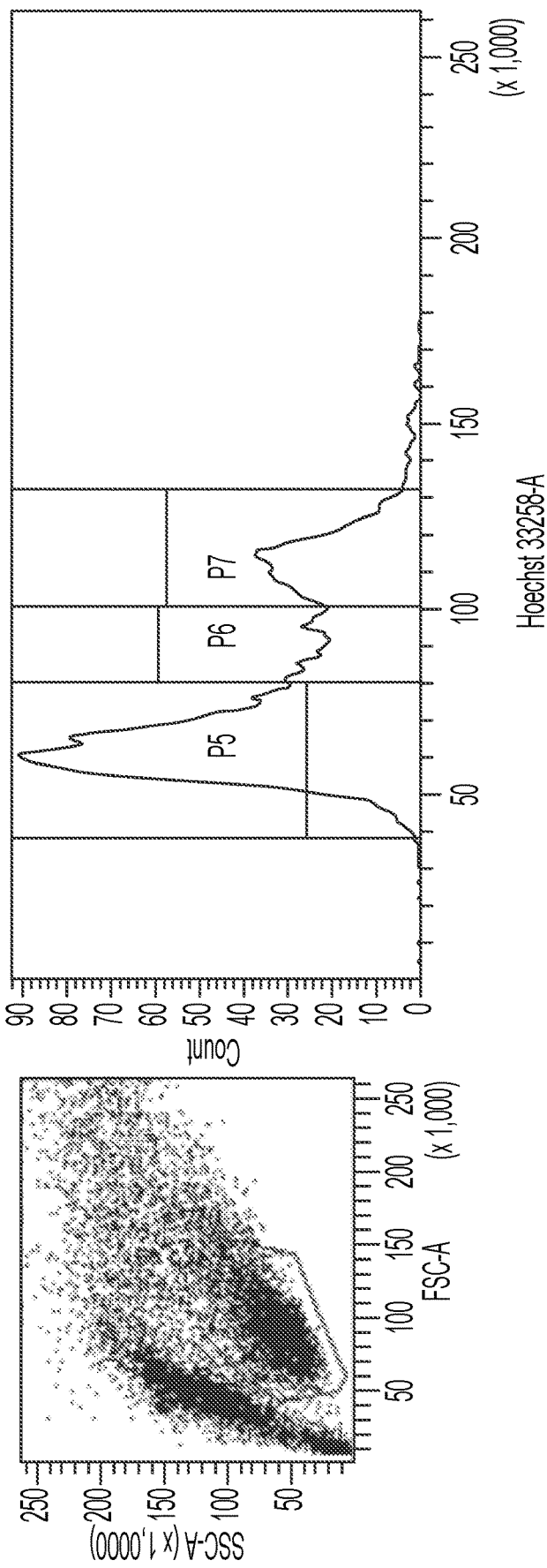
Figure 2:
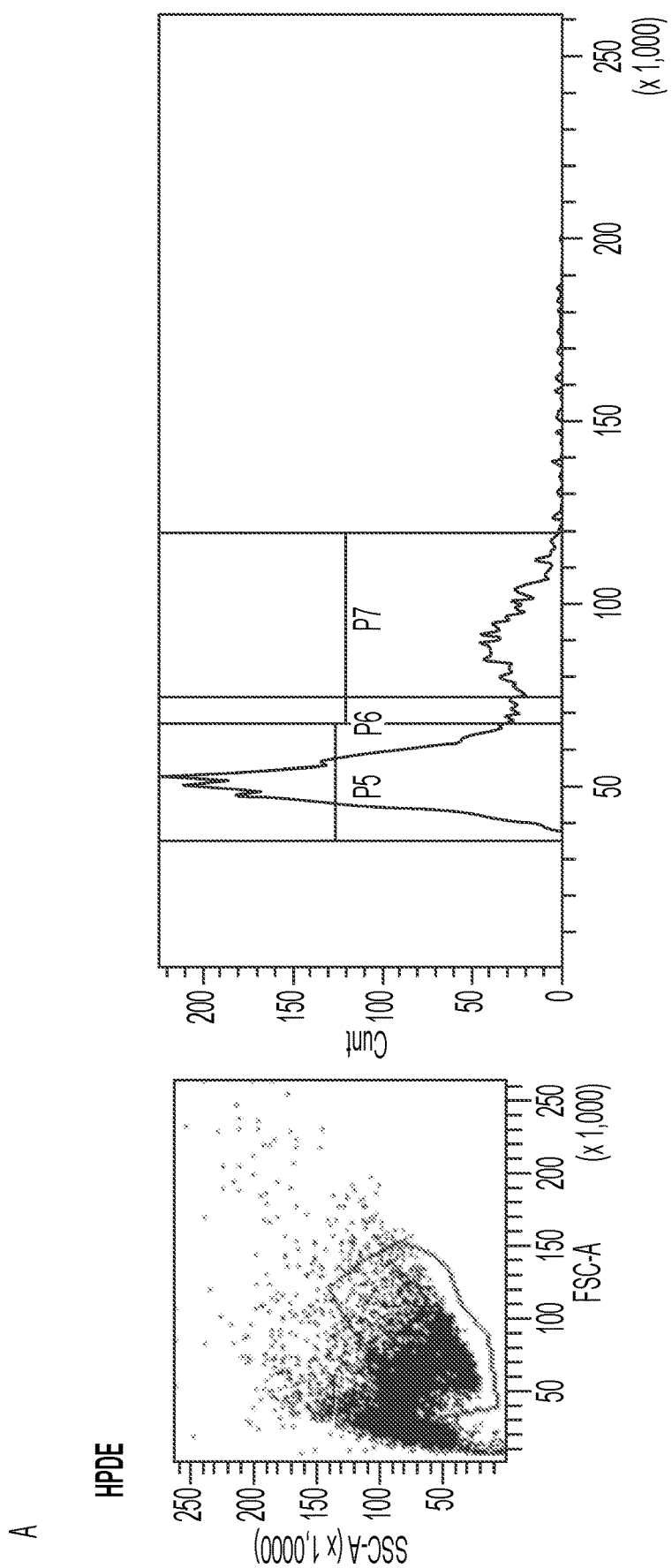
Figure 2:
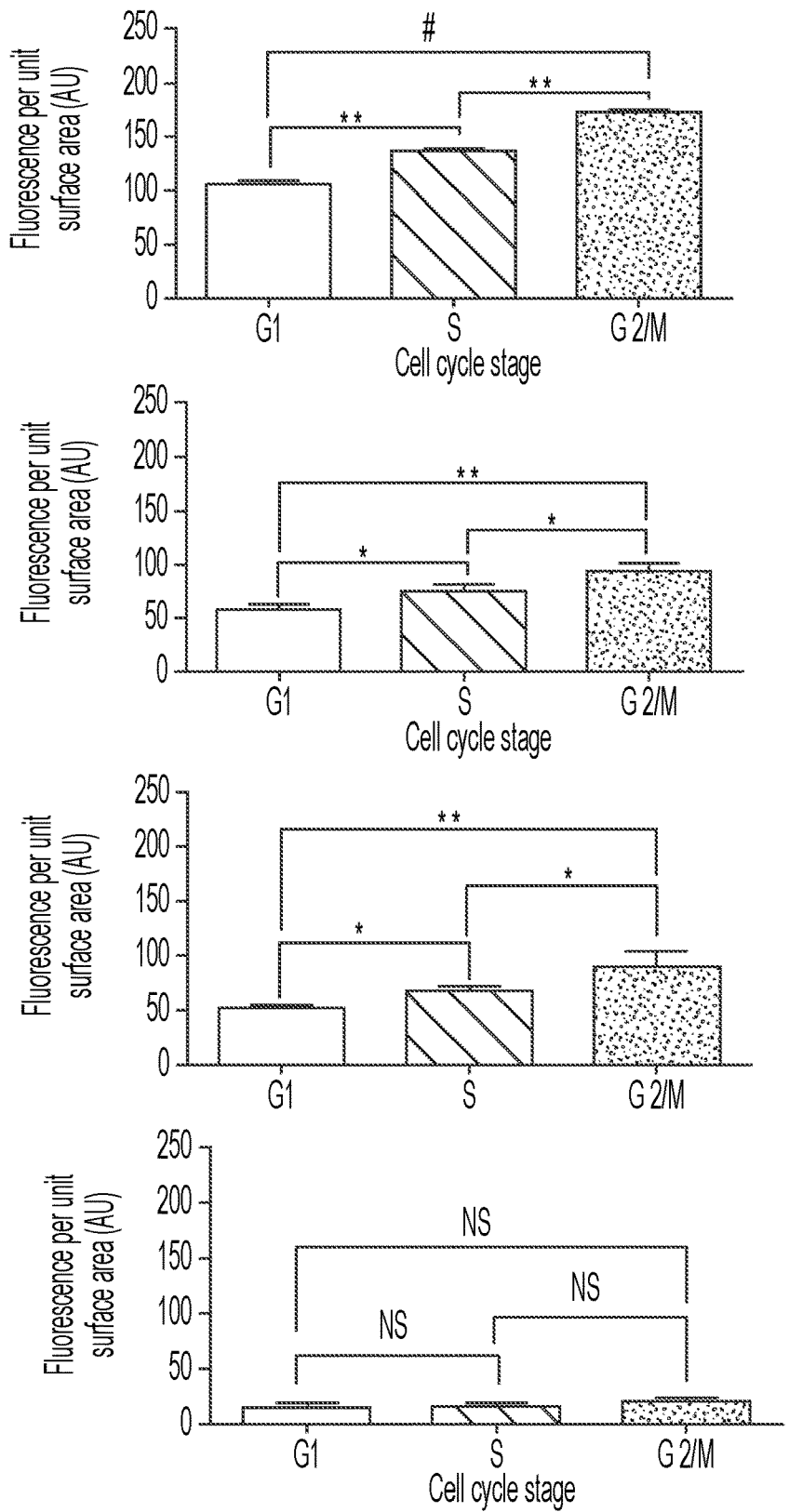
Figure 10:
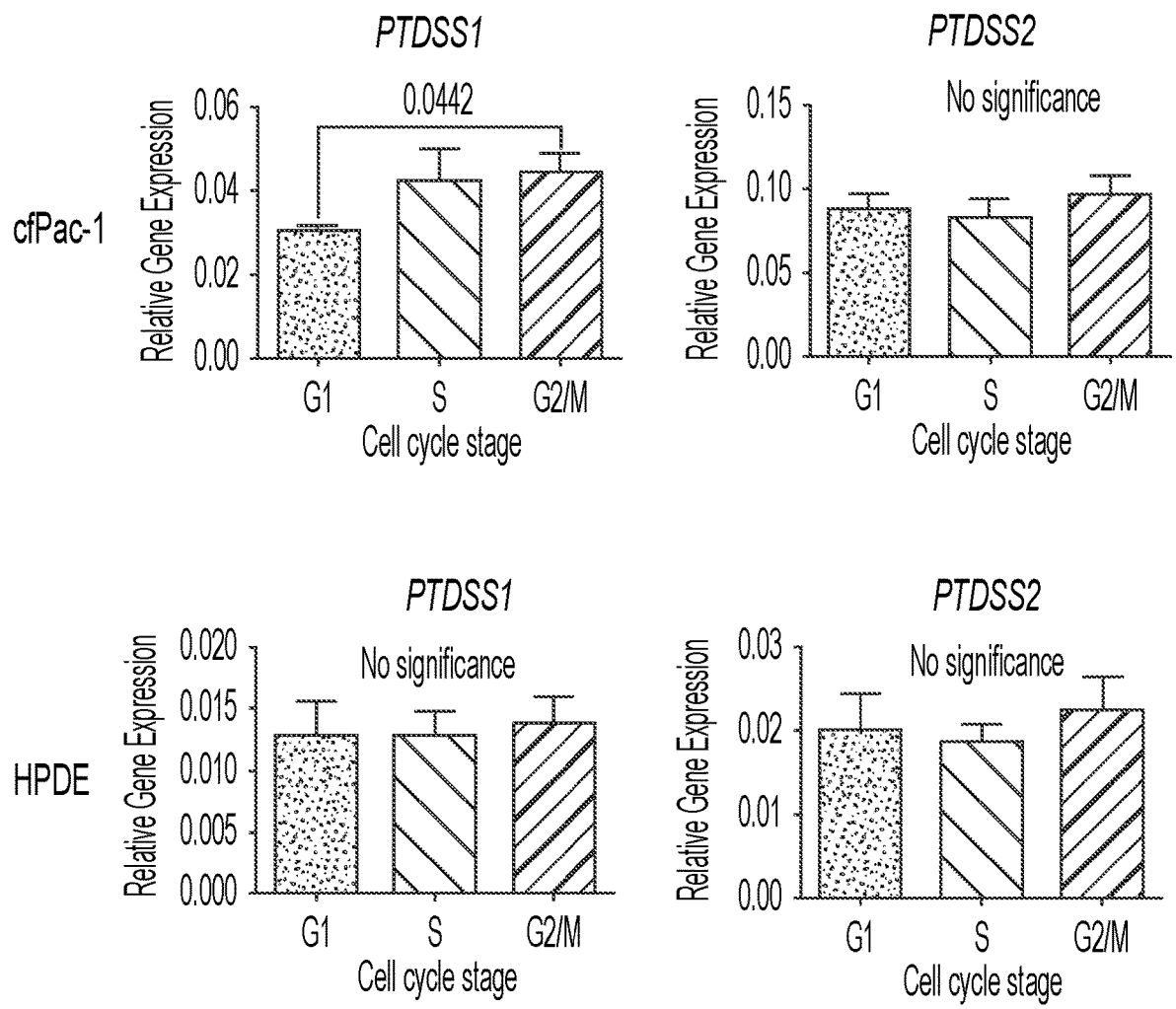
FIG. 10 shows PTDSS1 gene expression is elevated in G1 compared to G2/M phase in cfPac-1 cells. HPDE and cfPac-1 cells were sorted into G1, S and G2/M populations and quantitative PCR was used to measure PTDSS1 and PTDSS2 gene expression.
Figure 11:
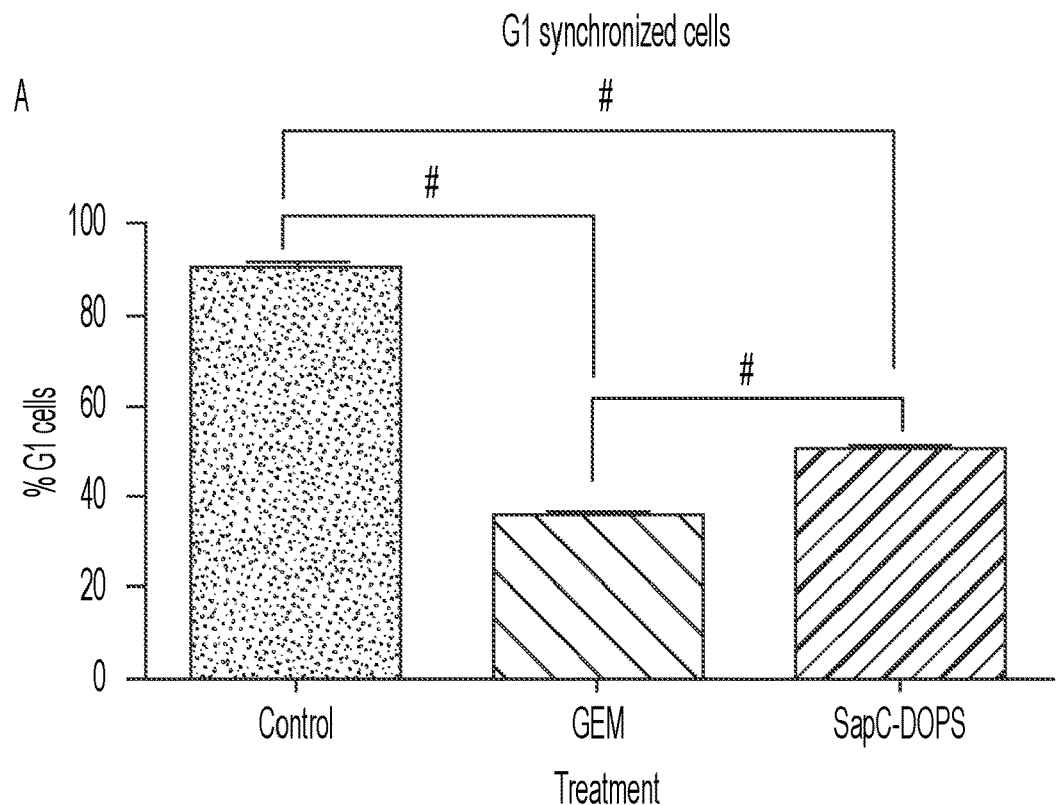
FIG. 11 shows GEM preferentially targets G1 cells compared to SapC-DOPS and SapC-DOPS preferentially targets G2/M cells compared to GEM. MiaPaCa-2 were treated with 4 mM hydroxyurea (HU) for synchronization. After 24 hrs. of treatment, cells were predominantly in G1. Following HU treatment, cells were incubated with DMEM for 6 hr after which cells were predominantly in G2/M phase. A shows G1 synchronized and B shows G2/M synchronized were treated with either 1 µM GEM for 24 hrs. or with 30 µM of SapC-DOPS for 48 hrs. Following drug treatment, percent of cells in G1 and G2/M phase was measured using Hoechst staining*p<0.05**p<0.001, #p<0.0001.
Figure 11:
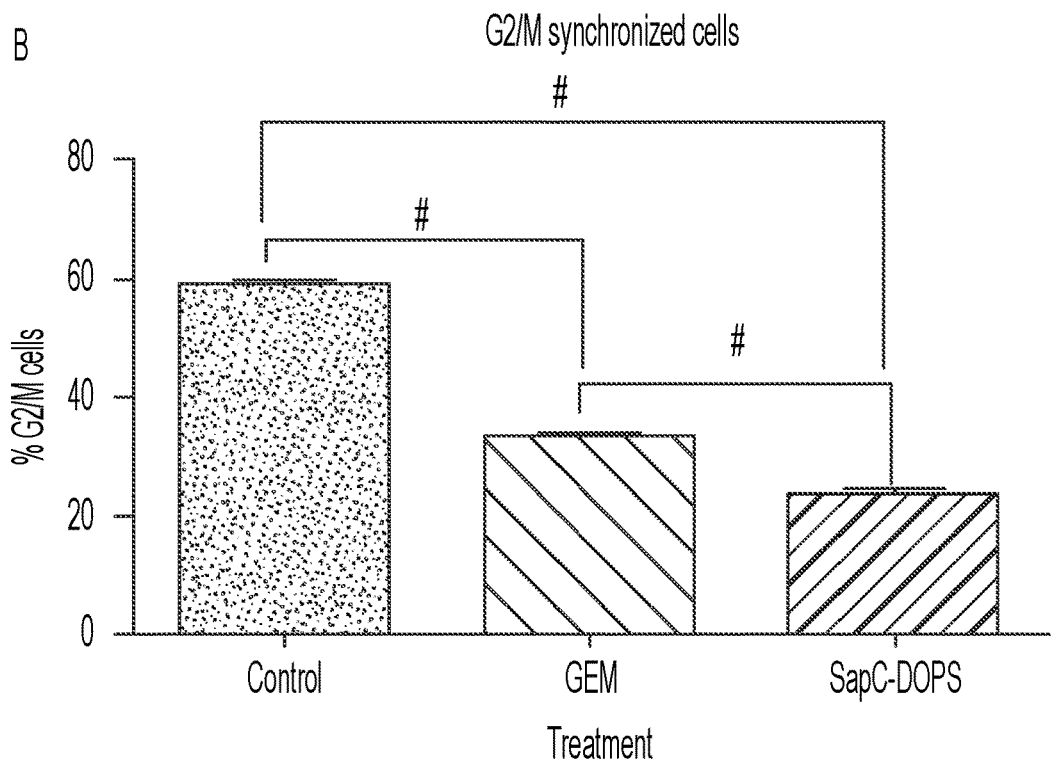

Surface PS expression increases during the cell cycle of pancreatic cancer cells. It is known that GEM targets cells in G1 phase of the cell cycle by inhibiting the production of key metabolites required for these cells to transition into S phase (Huang et al. Semin Oncol 1995; 22 (4 Suppl 11):19-25). Therefore, the relationship between PS and the cell cycle using Hoechst staining-based cell cycle analyses was investigated. Experiments were carried out in human pancreatic cancer cell lines as well as the p53 2.1.1 mouse cell line, derived from genetically engineered Trp53$^{Lox/++}$ and Cdkn2a$^{Lox/++}$ murine models of PDAC (Blanco et al. Oncotarget 2014; 5(16):7105-18). It was found that cell surface PS is relatively low in the G1 phase and progressively increases as the cells advance through S and G2/M phases of the cell cycle (FIG. 2). This increase in cell surface PS was observed in commonly used human pancreatic cell lines: cfPac-1 and MiaPaCa-2 as well as p53.2.1.1. Notably, this change in surface PS expression is not observed in healthy human pancreatic duct epithelial cells (HPDE). PS is synthesized in cells by PS synthase 1 (PSS1) and PS synthase 2 (PSS2) from phosphatidylcholine and phosphatidylethanolamine, respectively (Arikketh et al. J Biol Chem 2008; 283(19):12888-97). These PS synthase enzymes are encoded by PTDSS1 and PTDSS2 genes. To investigate the role of these genes on surface PS expression during the cell cycle, their expression at each stage of the cell cycle was measured (FIG. 10). It was found that PTDSS1 gene expression is increased in the G2/M phase compared to the G1 phase in pancreatic cancer cells while no difference was detected in HPDE cells. PTDSS2 expression did not change during the cell cycle in either cell line. Whether GEM and SapC-DOPS treatments would selectively target low surface PS cells in G1 and high surface PS cells in G2/M, respectively was subsequently tested, as displayed in FIG. 1. While there were fewer cells at each phase of the cycle after either treatment, these results show a significant decrease in the percentage of cells in the G1 phase and a concomitant increased percentage in the G2/M phase following GEM treatment in all pancreatic cancer cell lines tested. Conversely, a decrease in the G2/M population following SapC-DOPS treatment and an increase in the G1 populations in MiaPaCa-2 and cfPac-1 cell lines was observed (FIG. 3A). These results were confirmed with cyclin B1/cyclin D1 protein ratio measurements following treatment with either GEM or SapC-DOPS. Cyclin D1 is increased during G1 while cyclin B1 is increased during G2/M (Innocente et al. Proc Natl Acad Sci USA 1999; 96(5):2147-52, Baldin et al. Genes Dev 1993; 7(5):812-21) (FIG. 3B). Both cfPac-1 (FIG. 3C) and MiaPaCa-2 (FIG. 3C) showed an increase in G2/M cells following GEM treatment, reflected by an increase in the cyclin B1/cyclin D1 ratio. However, no significant change in the cyclin B1/cyclin D1 ratio was observed in either cell-line following SapC-DOPS treatment. These GEM results are similar to those obtained by Park et al. (Park et al. Braz J Med Biol Res 2015; 48(2): 111-9). Since estimating cell cycle stage specific targeting using asynchronous cells may be misleading due to the heterogeneity of the cells, MiaPaCa-2 cells were synchronized at G1 and G2/M phase and treated with either GEM or SapC-DOPS (FIG. 11). The results show that when G1 synchronized cells are treated with GEM or SapC-DOPS (FIG. 11A), GEM shows increased targeting of G1 cells compared to SapC-DOPS. Inversely, when G2/M synchronized cells are treated with GEM or SapC-DOPS (Supplemental FIG. 11B), SapC-DOPS shows increased targeting of G1 cells compared to GEM.

Gemcitabine increases cell surface PS. Since SapC-DOPS targets high surface PS cells, it was investigated whether treatment with GEM would increase surface PS expression in PDAC cells thereby sensitizing them to SapC-DOPS treatment. Flow cytometry was used to measure externalization of PS on propidium iodide (PI)-negative cells to distinguish non-apoptotic cells. Sub-toxic concentrations of GEM that caused <10% apoptosis increased surface PS in viable PDAC cells (FIG. 4C). Notably, the increase in surface PS observed in the treated cell population represents a shift in the median expression of surface PS, however, the population remains heterogeneous in surface PS expression. Importantly, GEM induced an increase in surface PS in tumor cells isolated from subcutaneous xenografts 48 hrs. following in vivo administration of 40 mg/kg GEM (FIG. 4D).

GEM sensitizes PDAC cells to SapC-DOPS-mediated cell death. Cytotoxicity assays were performed to assess whether prior GEM exposure enhances tumor cell killing by SapC-DOPS. Experiments were carried out in human pancreatic cancer cell lines as well as PI34, a primary PanIN line generated from Pdx-Cre; LSL-Kras$^{G12D}$; p16$^{fl/fl}$ (Davis et al. Oncotarget 2019; 10:856-868, Collisson et al. Cancer Discov 2012; 2(8):685-93) (FIG. 5D). As shown in FIGS. 5A&B, combination treatment with GEM and SapC-DOPS markedly enhanced the toxicity against tumor cells when compared with either agent alone. Current pancreatic cancer therapy commonly consists of GEM in combination with Abraxane® (paclitaxel bound to albumin). This combination with SapC-DOPS was therefore used. Abr/GEM pre-treatment also enhanced the effects of SapC-DOPS (FIGS. 5 C&D).

Figure 12:
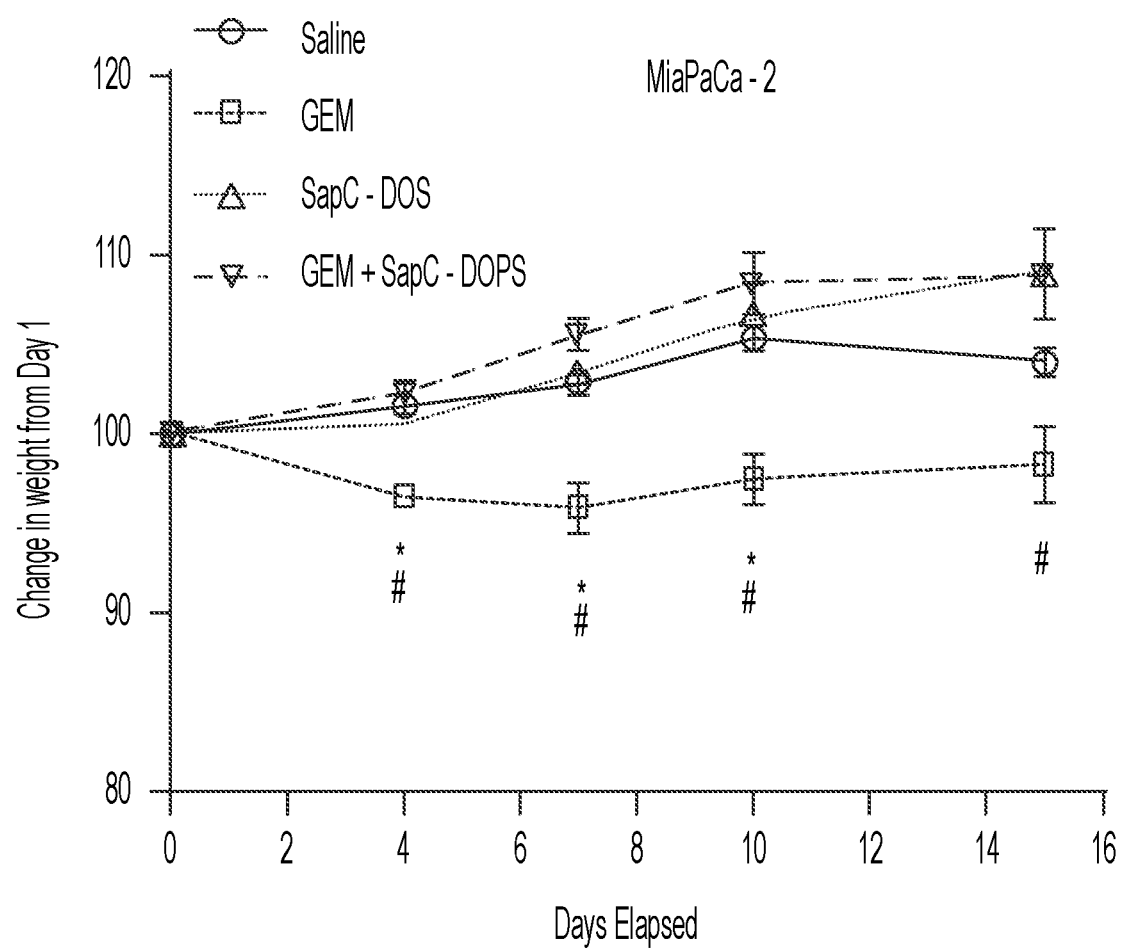
FIG. 12 shows SapC-DOPS alleviates weight loss due to GEM treatment alone. The mice treated in FIG. 6 were weighed on the indicated days. There was a significant decrease in mouse weight with GEM treatment compared to control. However, SapC-DOPS prevented the weight loss due to GEM alone. *p<0.01 between saline and GEM alone. #p<0.01 between GEM and SapC-DOPS or GEM and the combination of GEM and SapC-DOPS.

Combination therapy with GEM and SapC-DOPS has enhanced anti-tumor effects in vivo. The therapeutic effects of combination treatment with GEM and SapC-DOPS were studied in nude mice bearing human PDAC xenografts produced by subcutaneous implantation of MiaPaCa-2 cells, and in immunocompetent mice bearing syngeneic, orthotopic allografts induced by injecting mouse p53 2.1.1 cells. Combination treatment completely inhibited tumor growth in established heterotopic xenografts (FIG. 6A-C) and yielded significant survival benefit in the allograft model (FIG. 7E). To evaluate the effects of SapC-DOPS in an aggressive PDAC setting, we used 4580P cells derived from the LSL-Kras$^{G12D/+}$; LSL-Trp53$^{R172H/+}$; PDX-1-Cre-Luc (KPC) mouse model of PDAC (35). Abr/GEM treatment enhanced the effects of SapC-DOPS on 4580P subcutaneous tumors (FIG. 6D). Additionally, SapC-DOPS treatment prevented much of the weight loss seen in the orthotopic tumor-bearing mice receiving only GEM (FIG. 12).

Discussion

GEM in combination with Abraxane (nab-paclitaxel) is one of the first-line treatments for inoperable PDAC, but for most patients it fails to provide an appreciable survival benefit. GEM and other chemotherapeutics induce cellular damage and ultimately trigger apoptotic events associated with an increase in PS externalization. GEM targets cells in G1 phase of the cell cycle by inhibiting the production of key metabolites required for these cells to transition into S phase (Park et al. Braz J Med Biol Res 2015; 48(2):111-9). It is also known that SapC-DOPS targets cells rich in surface PS expression because saposin C requires direct binding and interaction with PS to exert its enzyme activating activity leading to a ceramide cascade and eventual apoptosis in cells (Chu et al. PLoS One 2013; 8(10):e75507). Furthermore, it has been found that the higher the PS expression on the surface of a cell, the more effectively SapC-DOPS binds to the cell and induces apoptosis (Chu et al. PLoS One 2013; 8(10):e75507). The data in FIG. 1 indicate that PS levels in human PDAC cells are heterogeneous in regards to PS exposure levels. Therefore, increasing the heterogeneous surface PS expression in tumors could sensitize them to SapC-DOPS binding and subsequent killing. Previous studies have exploited the PS-inducing properties of chemotherapeutic agents to test antibody-based, PS-targeted cancer therapies, concluding that combination modalities yielded higher antibody binding to tumor vasculature and enhanced anti-tumor effects (Huang et al. Cancer Res 2005; 65(10): 4408-16, Beck A et al. Int J Cancer 2006; 118(10):2639-43, Judy et al. Neoplasia 2012; 14(4):352-9). It has also been reported that SapC-DOPS nanovesicles exert PS-dependent toxicity against human pancreatic cancer cells in vitro and in vivo (Chu et al. PLoS One 2013; 8(10):e75507, Blanco et al. Transl Oncol 2015; 8(3):196-203). Exposure to SapC-DOPS leads to extensive death in cultured human PDAC cell lines, but not in non-transformed pancreatic ductal cells. The cytotoxic action requires a specific SapC-PS interaction, since DOPS liposomes alone are ineffective (Chu et al. PLoS One 2013; 8(10):e75507) and masking PS on cancer cells with beta-glycoprotein (Chu et al. PLoS One 2013; 8(10): e75507) or lactadherin (Chu et al. PLoS One 2013; 8(10): e75507, Blanco et al. Oncotarget 2014; 5(16):7105-18) greatly diminishes SapC-DOPS targeting. This study sought to investigate a mechanism and therapeutic response for GEM and SapC-DOPS combination therapy.

Figure 3:
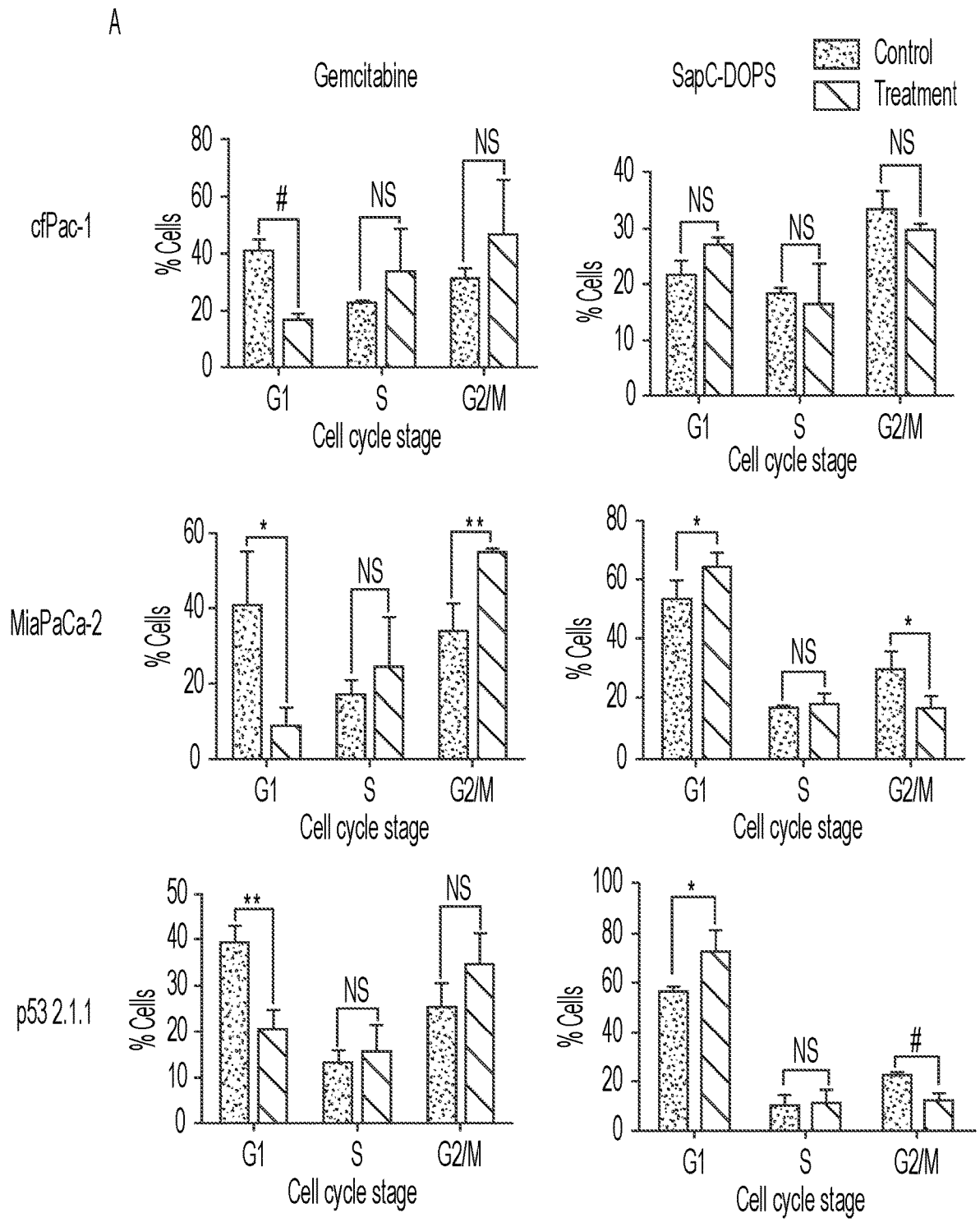
FIG. 3 shows that GEM and SapC-DOPS treatments preferentially target G1 and G2/M cells respectively. cfPac-1, MiaPaCa-2 and p53.2.2.1 were treated with 2 µM, 1 µM, or 1 µM GEM respectively for 24 hrs. and with 25 µM, 30 µM or 20 µM SapC-DOPS respectively for 72 hrs. A shows the percentage of cells in G1, S and G2/M was measured by cell cycle analyses using Hoechst staining following treatment with GEM or SapC-DOPS. Protein expression of cyclins D1 (a G1 marker) and B1 (a G2/M marker) following treatment with GEM or SapC-DOPS was measured by western blot and the cyclin B1 to cyclin D1 ratio was quantified in cfPac-1. B shows confirmation of cyclin expression during cell cycle by treating MiaPaCa-2 with 4 mM hydroxyurea (HU) for 24 hrs. and cyclin D1 and cyclin B1 expression measurement after treatment (G1 arrest) and following 6 hrs. release (G2/M). Cyclin D1 and cyclin B1 expression in cfPac-1 (C) and MiaPaCa-2 (D). $*p<0.05$, $**p<0.01$, $\#p<0.001$.
Figure 3:
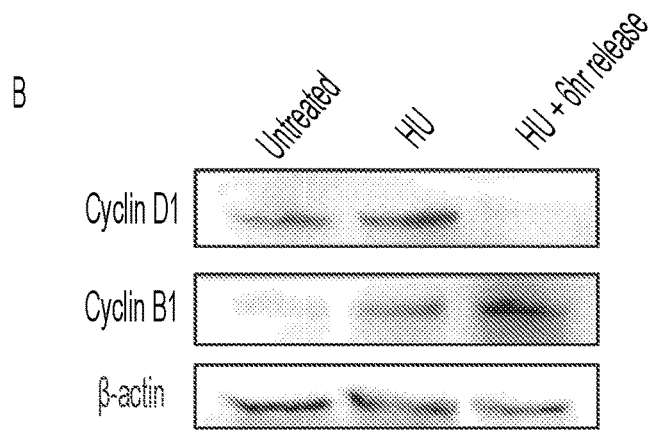
Figure 3:
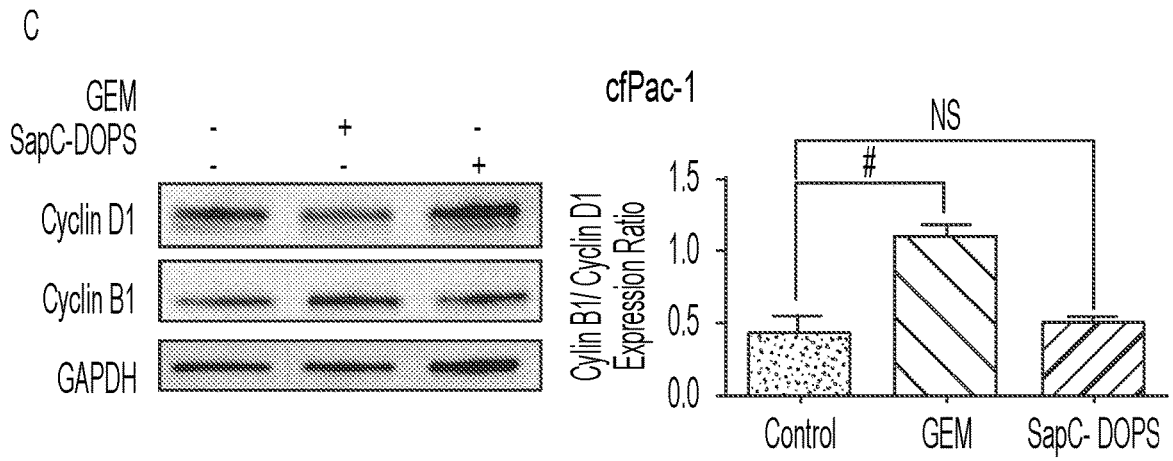
Figure 3:
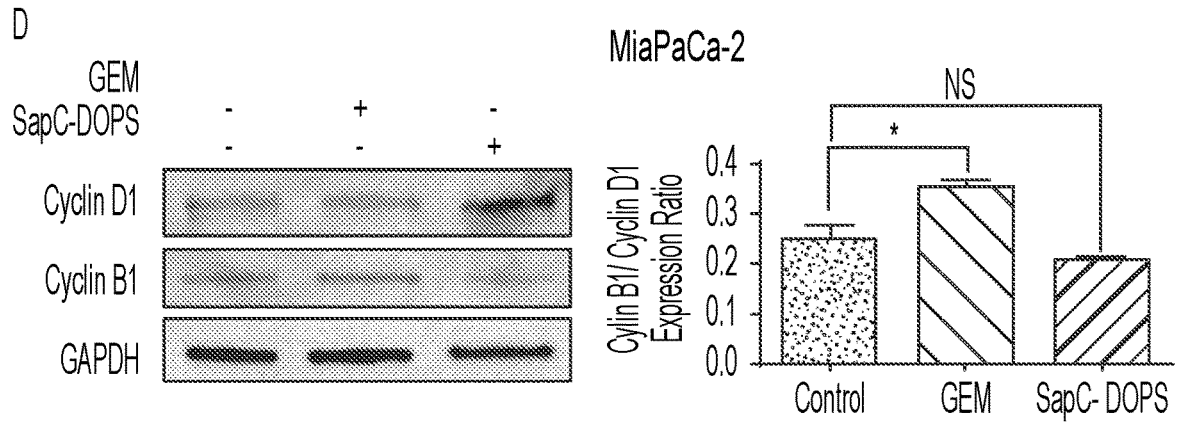

SapC-DOPS binding to cancer cells is dependent on PS expression on the cell surface. Upon binding to PS, saposin C is able to exert its enzymatic activity, ultimately resulting in cell death (Wojton et al. Oncotarget 2014; 5(20):9703-9). When individual pancreatic cancer cell lines with heterogeneous surface PS expression were sorted into low and high surface PS populations, SapC-DOPS killed the high surface PS population, leaving behind cells with lower surface PS cells (FIG. 9). Interestingly, the opposite was observed when pancreatic cancer cell lines were treated with GEM (FIG. 1). In this case, when sorted cells were treated with 50 nM GEM, cell death was more profound in the low surface PS population compared to the high surface PS population. Since it is known that GEM kills cells through a G1 targeting mechanism, and it was observed that GEM kills more low surface PS cells compared to high surface PS cells, it was hypothesized that low surface PS cells must correspond to G1 cells within a heterogeneous cell population. Indeed, when the relationship between cell surface PS and the cell cycle was investigated by measuring surface PS in G1, S and G2/M of the cell cycle (FIG. 2), it was found that cancer cells in G1 have lower surface PS compared to cells in G2/M phase. Interestingly, when these experiments were repeated in a non-cancerous pancreatic epithelial cell line (HPDE), there was no change in surface PS expression during the cell cycle. PS expression is regulated by the activity of PS synthase enzymes encoded by genes PTDSS1 and PTDSS2 (Arikketh et al. J Biol Chem 2008; 283(19):12888-97). The results observed in HPDE cells could be explained by the lack of PS synthase gene expression change during the cell cycle as seen in FIG. 10. Given these findings, a cell cycle and surface PS specific mechanism for GEM/SapC-DOPS combination treatment was directly tested where GEM targets G1 cells which are low in surface PS, leaving behind high surface PS cells in G2/M phase which can be targeted by SapC-DOPS (FIG. 3). The results indicate that in all three cell lines tested, GEM treatment significantly decreased the percentage of cells in G1 phase (FIG. 3A). This effect was accompanied by an increase in cyclin B1/cyclin D1 ratio (FIGS. 3C&D). As G1 cells decreased following GEM treatment, cells in G2/M became the predominant cell population remaining. Inversely, following SapC-DOPS treatment, G2/M cells were decreased in MiaPaCa-2 and p53 2.1.1 cells and G1 cells increased in proportion. However, these results were not accompanied by a decrease in the cyclin B1/cyclin D1 ratio. Furthermore, changes in cfPac-1 cells were not significant. Although cells were only treated for 24 hrs. to reduce cell death, during GEM and SapC-DOPS treatment, it is important to note that the cyclin B1/cyclin D1 ratio measurements included some adherent dead cells that were excluded in the flow cytometry analyses. These dead cells may mask the effects of SapC-DOPS on the cyclin B1/cyclin D1 ratio that were observed by flow cytometry. Further experiments investigating time-dependent effects of SapC-DOPS on the cell cycle may help distinguish non cell death effects on the cell cycle. In addition, G2/M cells may only represent a fraction of high surface cells. Nonetheless, these results are consistent with reports that increased surface PS is a common consequence of cytotoxic drug exposure (21, 22) and that GEM targets cells in G1 phase of the cell cycle (30). Since measurement of cell cycle stage targeting using a heterogeneous asynchronous cell population may be misleading given the low availability of cells at all stages of the cell cycle, cell cycle stage targeting by GEM and SapC-DOPS was investigated using synchronized cells (FIG. 11). The data confirms that GEM shows increased targeting of G1 cells compared to SapC-DOPS and that SapC-DOPS shows increased targeting of G2/M compared to GEM. Altogether, these data strongly support a cell-cycle and surface PS based mechanism for GEM/SapC-DOPS combination therapy where GEM specifically targets G1 cells which are low in surface PS resulting in an increased percentage of G2/M cells which exhibit high surface PS expression (FIG. 2). Subsequently, this increased in median surface PS expression allows for increased SapC-DOPS targeting.

Figure 4:
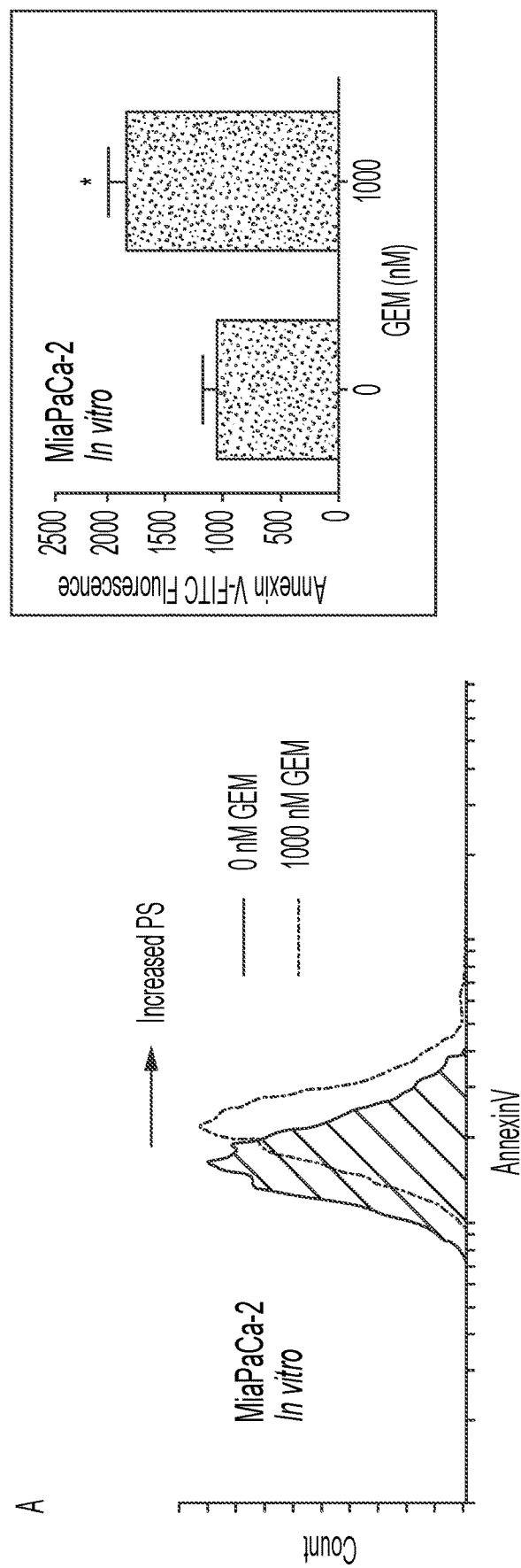
FIG. 4 shows that GEM exposure increases PS in pancreatic cancer cells. A shows MiaPaCa-2 cells and B shows cfPac-1 cells treated with varying doses of GEM for 48 hr. C shows tumors generated by injection of MiaPaCa-2 cells subcutaneously into the flanks of female nude mice. Cells were isolated 48 hr. following treatment with 40 mg/kg GEM, stained with annexin V-FITC and analyzed by flow cytometry. Only those cells that were negative for PI staining were assessed for annexin V labeling. Less than 10% of the cells (in vitro or in vivo) were killed by the GEM treatment.
Figure 4:
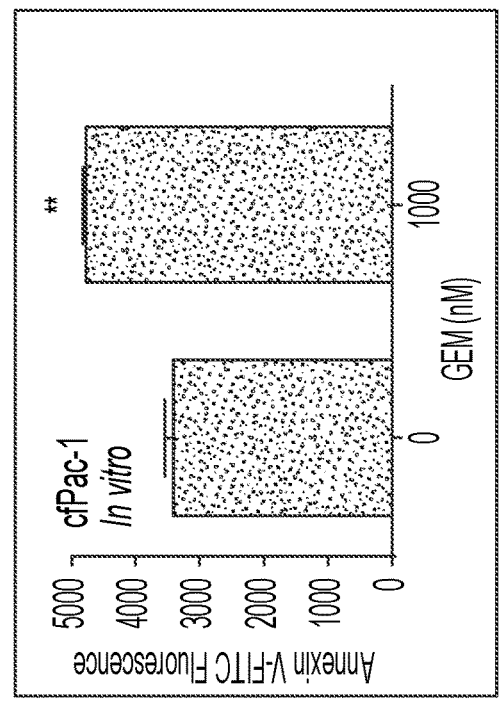
Figure 4:
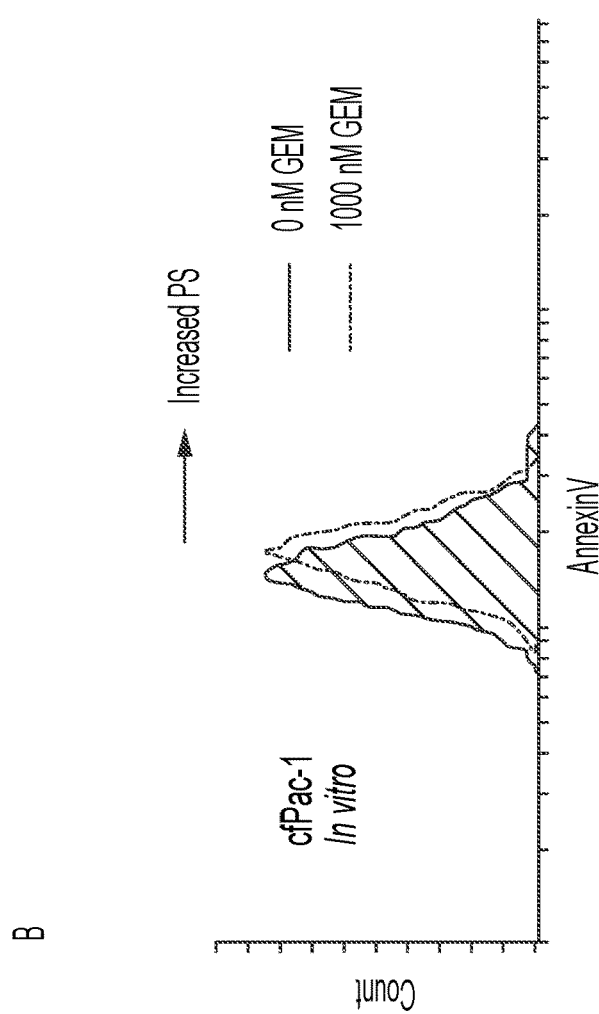
Figure 4:
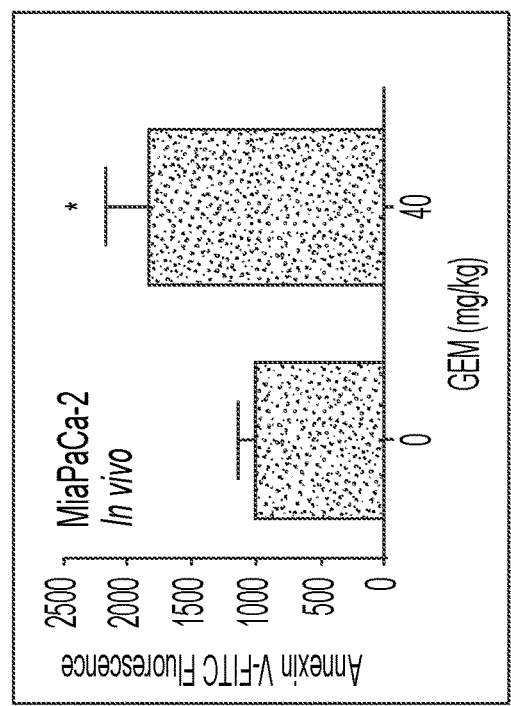
Figure 4:
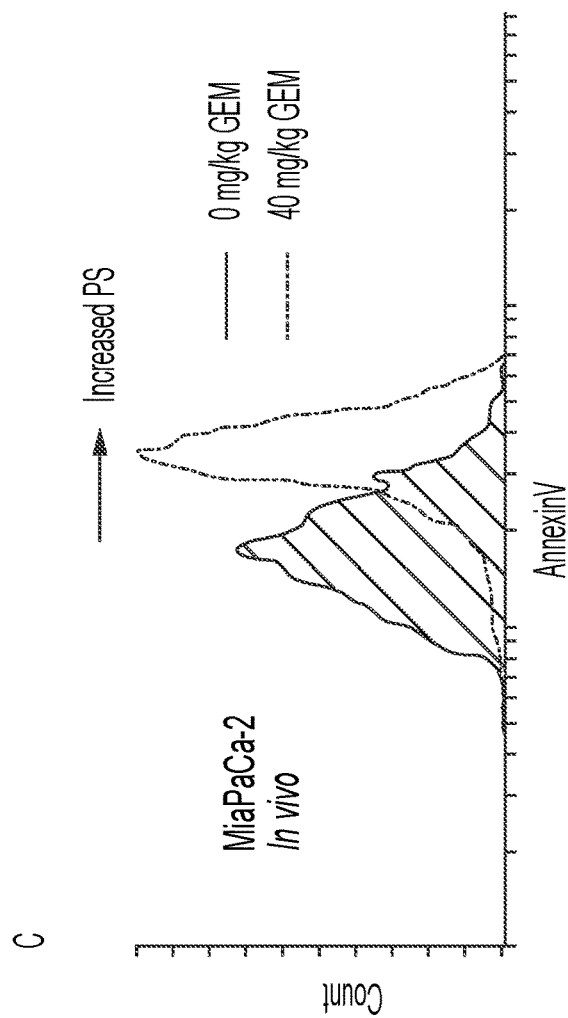
Figure 6:
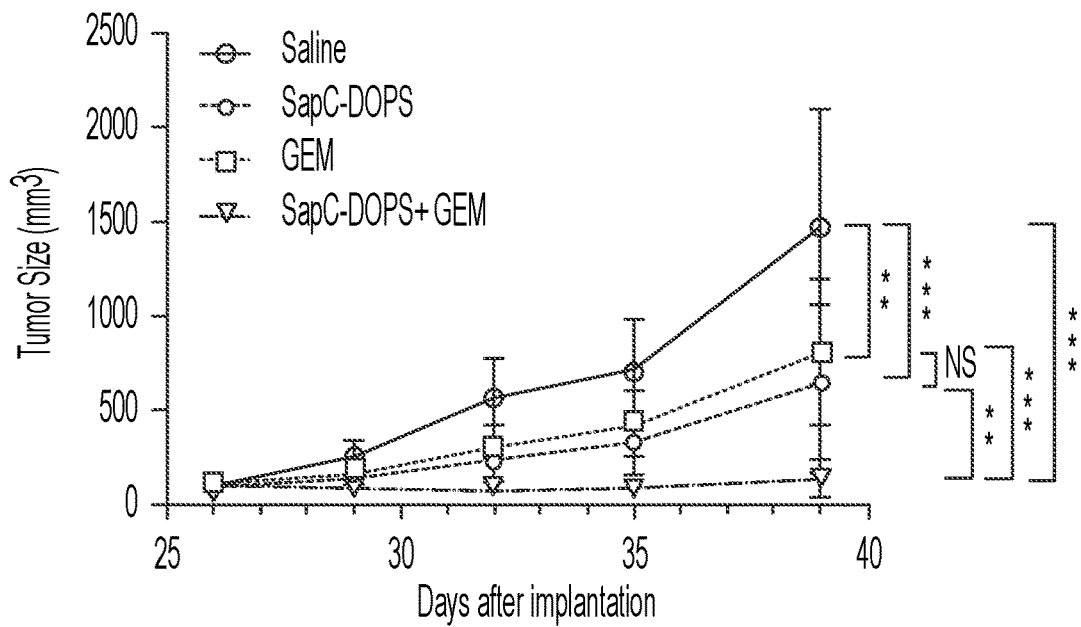
FIG. 6 shows that the combination treatment with SapC-DOPS and GEM suppresses tumor growth in subcutaneous tumor models. A, B and C show c57Bl/6J immunocompetent mice were injected with mouse p53 2.1.1 PDAC cells. A shows tumor size growth curves. B shows a photograph of the excised tumors (day 39). C shows tumor weight at euthanasia. SCD (SapC-DOPS). $p<0.01$, $*p<0.001$, NS not significant. D shows c57Bl/6J mice subcutaneously injected with $2 \times 10^6$ 4580P cells. When the tumors were ~100 mm$^3$, the mice were treated with saline, 20 mg/kg Abr/GEM (each drug), 4.9 mg/kg SapC-DOPS or a combination of Abr/GEM and SapC-DOPS on days 1 and 4. $*p<0.05$ between saline and drug.
Figure 6:
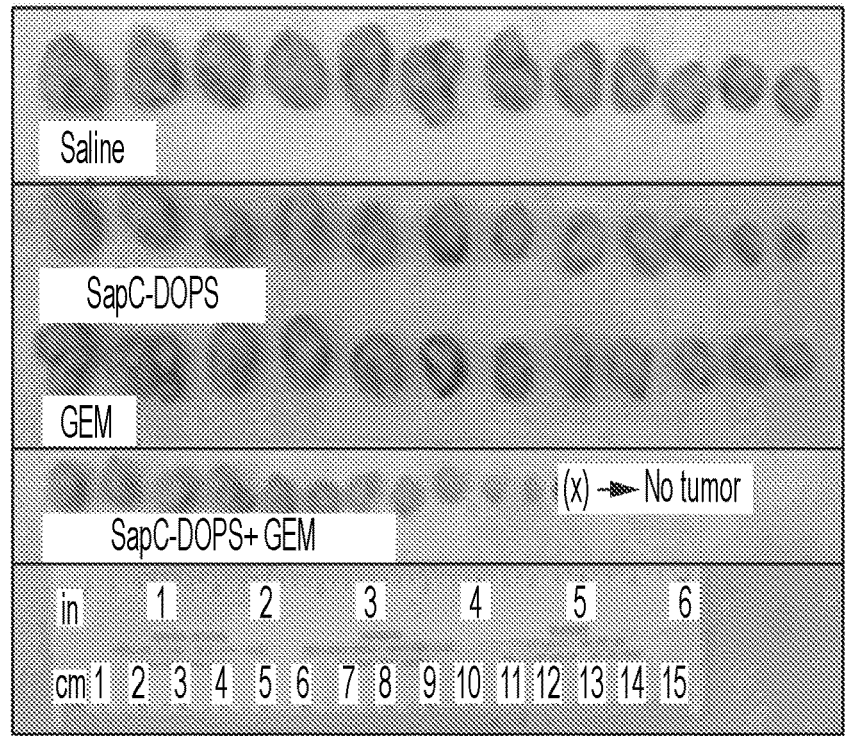
Figure 6:
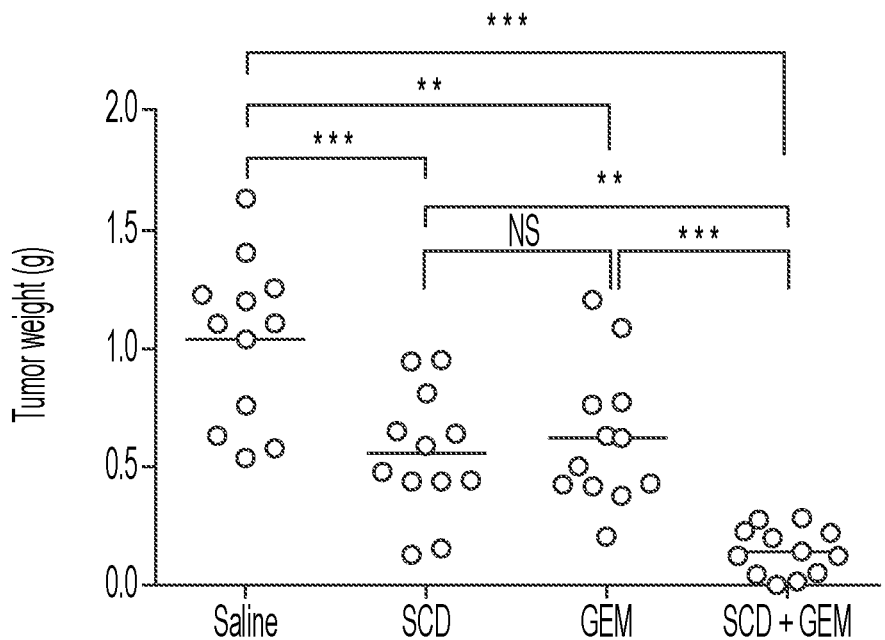
Figure 6:
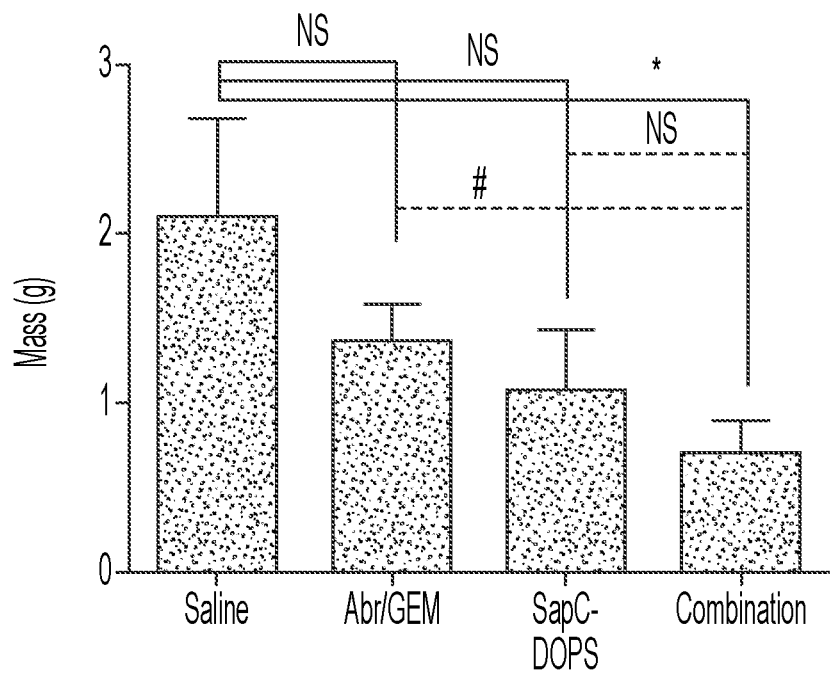
Figure 7:
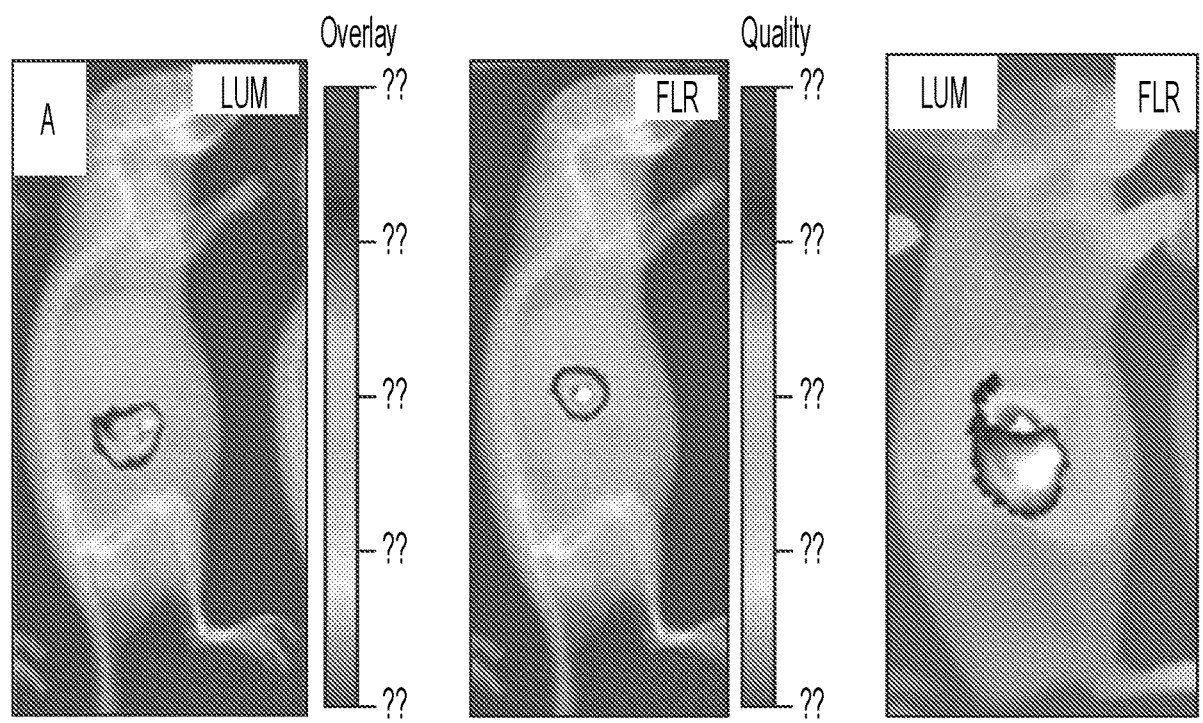
FIG. 7 shows that the combination treatment with SapC-DOPS and GEM prolongs survival and increases tumor death in orthotopic tumor models. Orthotopic allografts in c57Bl/6J immunocompetent mice. A shows whole body bioluminescence (LUM) imaging. Fluorescence imaging (FLR) shows tumor targeting by fluorescently labeled SapC-DOPS 28-29. B shows bioluminescence imaging at tumor cell post-implantation days 41 and 99 (euthanized) of a long-term surviving mouse treated with GEM and SapC-DOPS. The mouse showed no tumor signal at euthanasia. C shows cryosection of a p53 2.1.1 mouse pancreatic tumor tissue demonstrating extensive SapC-DOPS binding within and around ductal structures. D shows hematoxylin-eosin staining of p53 2.1.1 mouse PDAC section. E shows a survival curve of mice bearing orthotopic p53 2.1.1 PDAC allografts. Significant life extension was observed in the SapC-DOPS plus GEM sub-group. p values were calculated with the log rank test. $*p<0.05$ between SapC-DOPS/GEM and GEM alone, $**p<0.01$ between SapC-DOPS/GEM and DOPS.
Figure 7:
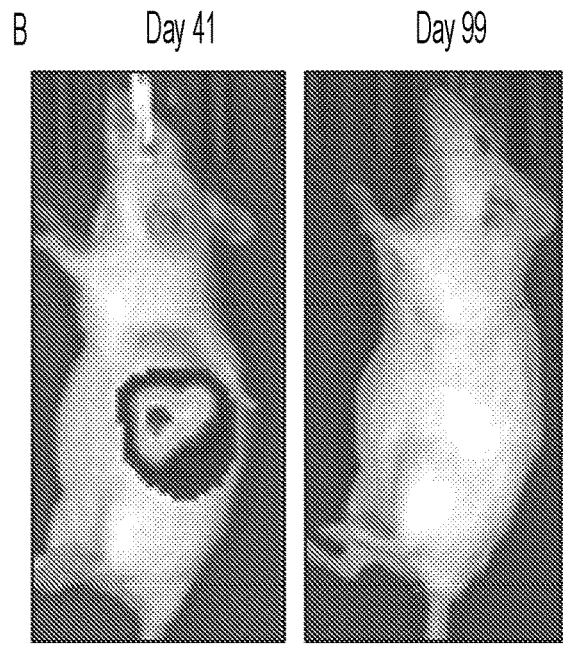
Figure 7:
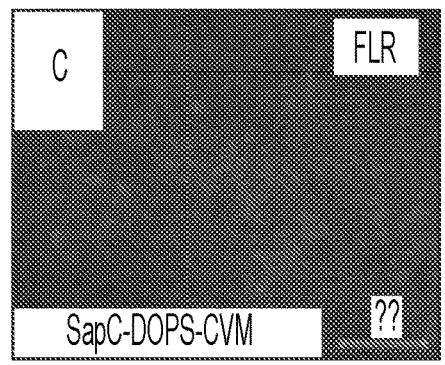
Figure 7:
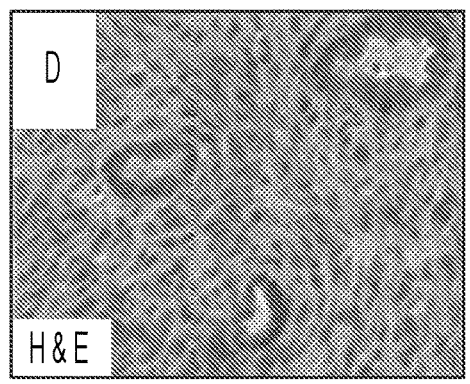
Figure 7:
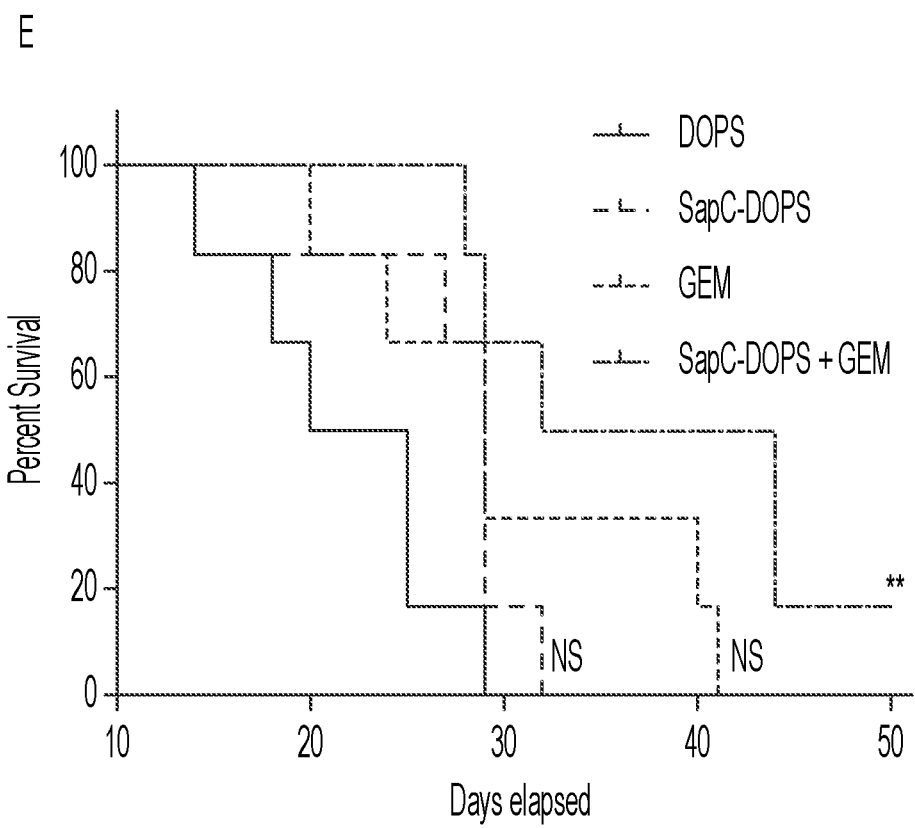
Figure 8:
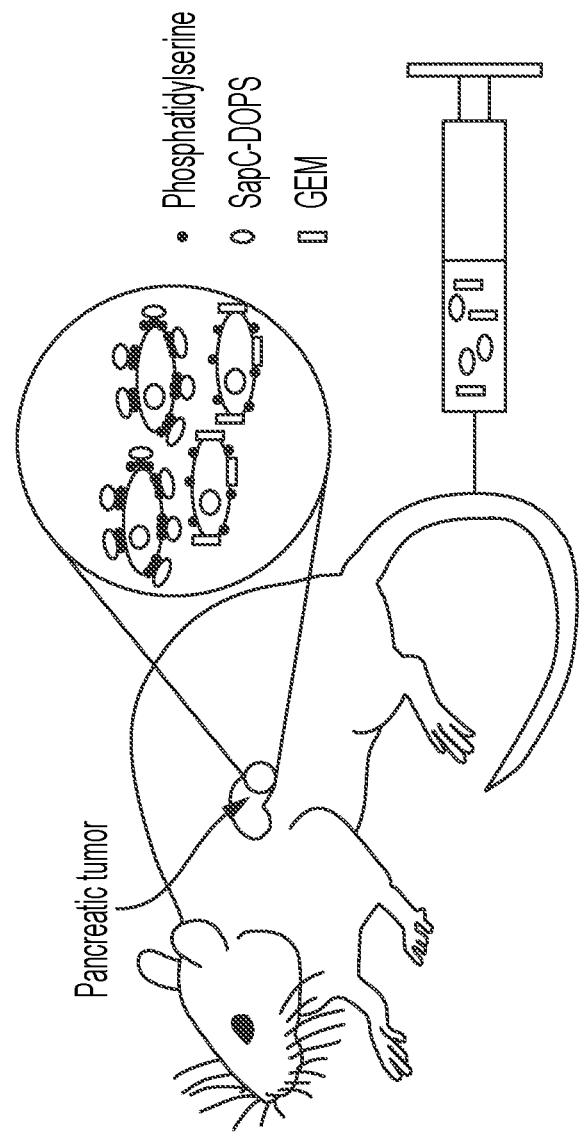
FIG. 8 shows a schema for different populations of cells based on surface PS levels being targeted by chemotherapeutic drugs, such as GEM and SapC-DOPS.

It has been previously shown that radiation therapy enhanced the effects of SapC-DOPS both in vitro and in vivo (Davis et al. Oncotarget 2019; 10:856-868). In addition, the combination of temozolomide and SapC-DOPS yields augmented tumor suppression in a mouse model of glioblastoma (Wojton et al. Mol Ther 2013; 21(8):1517-25). This study provides evidence for enhanced anti-tumor efficacy of SapC-DOPS combined with GEM in preclinical PDAC models. Specifically, it is shown that sub-toxic doses of GEM induce PS exposure in viable PDAC cells both in vitro and in vivo (FIG. 4). Although this could be expected since GEM treatment leads to apoptotic cell death which induces PS externalization, it was found that GEM also targets low surface PS cells more than high surface PS cells (FIG. 1). Thus although it is possible that the increase in surface PS in PDAC cells observed in FIG. 4 following GEM treatment could be in part due to early apoptosis, it may further be due to targeting of low surface PS cells in G1 by GEM leaving behind cells with higher surface PS. Furthermore, selected doses of SapC-DOPS and GEM provide additive or synergistic cell killing in vitro (FIG. 5), and significantly delay or arrest the growth of subcutaneous xenografts and orthotopic allografts (FIGS. 6&7). These results indicate that in both subcutaneous and orthotopic tumors growth is delayed or arrested by co-treatment with SapC-DOPS. As an added benefit, the enhanced effects are possibly due to GEM and SapC-DOPS killing the low surface PS cells and the high surface PS cells, respectively (see FIG. 8). An increase in surface PS promoted by GEM may also improve the SapC-DOPS-induced cytotoxicity. This suggests that standard chemotherapy treatments for PDAC (e.g. GEM) and other cancers may potentiate the anti-tumor actions of SapC-DOPS. Importantly, by reducing the dose of chemotherapeutic drugs while achieving tumor shrinkage with SapC-DOPS may reduce off-target toxic effects. Notably, SapC-DOPS has shown negligible toxicity in animal models and thus is not expected to trigger adverse effects in the clinical setting. Indeed, a Phase 1 clinical trial with SapC-DOPS has been completed and there were no significant adverse events (Rixe et al. J. Clin. Oncol 2018; 36 (Supplement):2517). Co-treatment with GEM (Abr/GEM) and SapC-DOPS could thus be exploited as an effective PDAC therapy, readily testable in thousands of patients already receiving Abr/GEM as first-line treatment.

Study Design

All experiments involving mice complied with National Institutes of Health guidelines. Protocols were approved by the Institutional Animal Care and Use Committee of the University of Cincinnati (IACUC number 11-05-05-02) and the Cincinnati Children's Hospital Research Foundation (IACUC number 2013-0052).

Cell lines. MiaPaCa-2 cells (ATCC), cfPac-1 (ATCC), p53 2.1.1-pMSCV-FLuc (a gift from Dr. E. Collisson, University of California, San Francisco, CA) and PI34 (a gift from Dr. A. D. Rhim, M. D. Anderson Cancer Center, Houston, TX) were cultured in DMEM supplemented with 10% FBS, and antibiotics (100 µg/ml streptomycin and 100 U/ml penicillin). 4580P cells were cultured in RPMI 1640 medium supplemented with 10% fetal bovine serum (FBS) and antibiotics. HPDE cells (ATCC) were cultured in Keratinocyte Serum-free Media supplemented with epidermal growth factor 1-53 (EGF 1-53), bovine pituitary extract (Invitrogen) and antibiotics. All other cell lines were grown in DMEM with 10% FBS. All cell lines were cultured at 37° C. in a humidified 5% $CO_2$ atmosphere.

Antibodies. Cyclin B1 rabbit Ab (4138S; Cell Signaling Technology), Cyclin D1 rabbit mAb (2978S; Cell Signaling Technology), GAPDH (97166; Cell Signaling Technology).

Preparation of SapC-DOPS nanovesicles. Dioleoylphosphatidylserine (DOPS; Avanti Polar Lipids Inc., Alabaster, AL) was dried under a stream of $N_2$ gas, combined with recombinant SapC protein (Qi et al. J Biol Chem 1994; 269(24):16746-53) and bath sonicated in PBS as described previously (Qi et al. Clin Cancer Res 2009; 15(18):5840-51). To fluorescently label SapC-DOPS nanovesicles, 30 µl of CellVue® Maroon (CVM, Molecular Targeting Technology Inc., Exton, PA; 1 mM stock in ethanol) was added to 82 µg DOPS and dried together before addition of 0.35 mg SapC, 20 µl of citrate-phosphate (CP) buffer (pH 5.0), and 1 ml PBS. After bath sonication, unbound CVM was removed from the nanovesicle suspension by filtration through a Sephadex™ G25 column (PD-10, Amersham Pharmacia Biotech, Piscataway, NJ).

Phosphatidylserine levels measurements. Surface membrane PS levels were measured using annexin V-FITC (Invitrogen, Carlsbad, CA) as previously described (Chu et al. PLoS One 2013; 8(10):e75507, Davis et al. Oncotarget 2019; 10:856-868). In brief, cells were harvested using trypsin-EDTA (Thermo Fisher Scientific); the trypsin was inactivated with complete media and the cells were washed with PBS and resuspended at 1,000,000 cells/ml in annexin staining buffer. Aliquots of cells (0.1 ml/tube) were incubated with 10 µl of annexin V-FITC for 15 minutes at room temperature in the dark. Then 400 µl of annexin staining buffer was added to each tube. Samples were kept on ice and analyzed by flow cytometry within 1 hour after addition of 2 µl of 50 µg/ml propidium iodide (PI; to exclude dead cells). The effects of GEM exposure on surface PS levels were studied in human PDAC cell lines (cfPac-1 and Mia-PaCa-2), a mouse PDAC cell line (p53 2.1.1) (Collisson et al. Cancer Discov 2012; 2(8):685-93) and immortalized, non-tumorigenic human pancreatic duct epithelial cells (HPDE). To this end, cells were incubated for 24 or 48 hr. with 10 nM-1 µM GEM and then stained with annexin V-FITC and PI and analyzed by flow cytometry.

Cell Sorting. Cells were grown to 60-80% confluency then stained with annexin V-FITC as above but without PI. The cells were then passed through a cell sorter (BD Aria III) and cells with low and high surface PS were collected (~15% of the cells at each end of the peak; see FIG. 1). The cells were placed in 96 well plates and immediately treated with 0, 25 or 50 nM of GEM. The MTT assay (Roche) was conducted 72 hr later to determine the effect of the GEM on cell viability.

Cell Cycle Analyses. For determining surface PS at different phases of the cell cycle, $10^6$ suspended cells were stained with Hoechst 33258 (Invitrogen; 500 fold dilution) in complete media for 45 min. at 37° C. The cells were washed with PBS then resuspended in annexin staining buffer and stained with annexin V-FITC as above for 15 min. Cells from the different cell cycle phases were gated and those cells were examined for annexin V positivity. Since cells are larger in G2 than in G1, the PS was adjusted for cell size (based on forward scatter).

For cell cycle analyses of cells treated with GEM or SapC-DOPS, MiaPaCa-2, cfPac-1 and p53.2.2.1 cells were cultured to 70% confluency. Cells ($2.5 \times 10^5$) were plated overnight in 60 mm cell culture plates. MiaPaCa-2, cfPac-1 and p53.2.2.1 were treated with 1 μM, 2 μM, and 1 μM GEM respectively for 24 hrs. or with 30 μM, 25 μM and 20 μM SapC-DOPS respectively for 72 hrs. (MiaPaCa-2 and p53.2.2.1) or 24 hrs (cfPac-1). Following treatment, $10^6$ cells were stained with Hoechst 33342 as described above.

Cell cycle arrest and synchronization. MiaPaCa-2 cells were grown to 70% confluency. Cells were treated with hydroxyurea (HU) in complete medium to a final concentration of 4 mM for 24 hrs. Following synchronization treatment, cells were lysed for western blotting or were washed and incubated with HU-free medium for 6 hrs. to collect cells in the G2/M phase. After the 6 hrs. release, cells were lysed for western blotting.

Quantitative PCR for gene expression of PS synthase enzymes. cfPac-1 cells were sorted in G1, S and G2/M cells population after Hoechst staining. Following cell sorting, RNA extraction was conducted using Qiagen® RNeasy® Mini Kit. Following RNA extraction, a two-step RT-qPCR was performed using the Roche Transcriptor First Strand cDNA Synthesis Kit and FastStart Universal SYBR Green Master. Primer pairs for PTDSS1 and PTDSS2 from Origene were used for qPCR.

In vivo tumor xenograft and allograft implantation. Subcutaneous PDAC xenografts were produced by injecting $2 \times 10^6$ human MiaPaCa-2 cells into the dorsal right flank of 8-10 weeks old female athymic nude mice or mouse p53.2.1.1 and 4580P cells into the same site of 5-6 week old female c57B1/6J mice. Orthotopic PDAC allografts were produced in c57B1/6J mice. After anesthesia with intraperitoneal injection of a ketamine/xylazine cocktail (ketamine 100 mg/kg IP and xylazine 20 mg/kg IP), the spleen was exteriorized through a small left abdominal flank incision. p53 2.1.1 tumor cells (1,000 cells in 30 μl PBS) were injected subcapsularly in a region of the pancreas just beneath the spleen using a 30-gauge needle as previously described (Chu et al. PLoS One 2013; 8(10):e75507).

For assessment of surface PS, when the subcutaneous tumors were 100-300 mm$^3$, some mice were treated with 40 mg/kg GEM and the tumors were removed 48 hr. later. The tumors were minced then incubated with 5 ml of collagenase type IV (200 U/ml) at 37° C. for 2 hrs. The cells were passed through a 40 μm filter, washed with PBS then stained with annexin V-FITC and analyzed by flow cytometry.

In vivo combination therapy. Xenografts: after tumor mean volume reached 100 mm$^3$, mice (12/group) were treated with saline (control), GEM (40 mg/kg; i.p.), SapC-DOPS (4.9 mg/kg; i.v.) or SapC-DOPS plus GEM. Mice were injected with the drugs starting on day 26 and every 3 days thereafter until euthanasia. Alternatively, when the tumors were ~100 mm$^3$, the mice were treated with saline, 20 mg/kg Abr/GEM (each drug), 4.9 mg/kg SapC-DOPS or a combination of Abr/GEM and SapC-DOPS on days 1 and 4.

Allografts: 16 days after cell implantation tumor presence was confirmed by bioluminescence and animals were separated into 4 groups (n=6/group), receiving the following treatments: 1) DOPS (1.9 mg/kg); 2) GEM (10 mg/kg; i.p.); 3) SapC-DOPS (3 mg/kg SapC; 1.9 mg/kg DOPS; i.v.); and 4) SapC-DOPS plus GEM (at indicated doses). Drugs were administered 2 times/week until day 55.

Western blot analyses. Following treatment with GEM or SapC-DOPS, cells were washed with PBS and lysed in RIPA Buffer (Sigma) supplemented with protease inhibitor cocktail tablets (Roche). A total of 30 μg of protein extract was separated using 4-15% Mini-PROTEAN Precast Gels (Bio-Rad) and transferred to Hybond-ECL Nitrocellulose membrane (Biosciences). Membranes were blocked for 1 hr. in 5% nonfat dry milk in 0.1% Tween-20 in PBS at 4° C. Blocked membranes were incubated with primary antibodies overnight at 4° C. Subsequently, membranes were washed 3 times for 10 min. with 0.1% Tween-20 in PBS. Secondary antibodies were incubated for 1 hr. at room temperature. Membranes were washed as above and incubated with SuperSignal West Dura Extended Duration Substrate (Thermo Scientific) for 5 min. Detection was performed using the ChemiDoc Touch Imaging System (Bio-Rad). Image Lab 5.2.1 software (Bio-Rad) was used to quantify the proteins on the western blots.

The foregoing description of several aspects has been presented for purposes of illustration. It is not intended to be exhaustive or to limit the application to the precise forms disclosed, and obviously many modifications and variations are possible in light of the above teaching. It is understood that the disclosure may be practiced in ways other than as specifically set forth herein without departing from the scope of the disclosure. Any patents or publications mentioned in this specification are incorporated herein by reference to the same extent as if each individual publication is specifically and individually indicated to be incorporated by reference.

The invention claimed is:

1. A method for treating cancerous or pre-cancerous pancreatic cells comprising administering to cells in G2/M phase a therapeutically effective amount of saposin C-dioleoylphosphatidylserine (SapC-DOPS) and administering to cells in G1 phase a nucleoside chemotherapeutic.

2. The method of claim 1, wherein the nucleoside chemotherapeutic comprises gemcitabine.

3. The method of claim 1, wherein the method further comprises administering nab-paclitaxel.

4. The method of claim 1, wherein the SapC-DOPS and the nucleoside chemotherapeutic are administered simultaneously.

5. The method of claim 1, wherein the SapC-DOPS and the nucleoside chemotherapeutic are administered sequentially.

6. The method of claim 1, wherein the cells are in vitro.

7. The method of claim 1, wherein the cells are in vivo.

8. A method for treating pancreatic cancer in a subject, comprising administering a combination of a therapeutically effective amount of SapC-DOPS and a nucleoside chemotherapeutic to the subject, wherein the nucleoside is administered to target cells in G1 phase and wherein the SapC-DOPS is administered to target cells in G2/M phase.

9. The method of claim 8, wherein the nucleoside chemotherapeutic comprises gemcitabine.

10. The method of claim 8, wherein the method further comprises administering nab-paclitaxel.

11. The method of claim 8, wherein the SapC-DOPS and the nucleoside chemotherapeutic are administered simultaneously.

12. The method of claim 8, wherein the SapC-DOPS and the nucleoside chemotherapeutic are administered sequentially.

13. The method of claim 8, further comprising administering an additional chemotherapeutic or therapy to the subject.

14. The method of claim 13, wherein the additional chemotherapeutic is selected from the group consisting of everolimus, erlotinib, 5-fluorouracil, irinotrecan, olaparib, mitomycin, paclitaxel, sunitinib, FOLFIRINOX, cisplatin, oxaliplatin, lanreotide, lutetium Lu 177-dotatate, or a combination thereof.

15. The method of claim 13, wherein the additional therapy is selected from antibody therapy, gene silencing therapy, vaccine therapy, or radiation therapy.

16. The method of claim 8, wherein the combination is administered in a plurality of doses over a treatment period.

17. The method of claim 16, wherein the treatment period comprises from about 14 to 40 consecutive days.

18. The method of claim 16, wherein the SapC-DOPS is administered in a dose of from about 0.3 mg/kg to about 12 mg/kg.

19. The method of claim 16, wherein the nucleoside chemotherapeutic is administered in a dose of from about 10 mg/kg to about 150 mg/kg.

20. A method for sensitizing pancreatic cells to SapC-DOPS comprising administering to the pancreatic cells gemcitabine to advance the cell to G2/M phase, wherein gemcitabine increases cell surface expression of phosphatidylserine (PS), thereby sensitizing the pancreatic cell to SapC-DOPS binding.

\* \* \* \* \*

SEQUENCE LISTING

```
<160> NUMBER OF SEQ ID NOS: 1

<210> SEQ ID NO 1
<211> LENGTH: 80
<212> TYPE: PRT
<213> ORGANISM: Artificial Sequence
<220> FEATURE:
<223> OTHER INFORMATION: Synthetic Construct

<400> SEQUENCE: 1

Ser Asp Val Tyr Cys Glu Val Cys Glu Phe Leu Val Lys Glu Val Thr
1               5                   10                  15

Lys Leu Ile Asp Asn Asn Lys Thr Glu Lys Glu Ile Leu Asp Ala Phe
            20                  25                  30
```

-continued

```
Asp Lys Met Cys Ser Lys Leu Pro Lys Ser Leu Ser Glu Glu Cys Gln
         35              40              45

Glu Val Val Asp Thr Tyr Gly Ser Ser Ile Leu Ser Ile Leu Leu Glu
     50              55              60

Glu Val Ser Pro Glu Leu Val Cys Ser Met Leu His Leu Cys Ser Gly
65              70              75              80
```